(12) United States Patent
Baltrenas

(10) Patent No.: US 11,716,307 B1
(45) Date of Patent: *Aug. 1, 2023

(54) DOMAIN NAME SYSTEM CONFIGURATION DURING VIRTUAL PRIVATE NETWORK CONNECTION

(71) Applicant: Oversee, UAB, Vilnius (LT)

(72) Inventor: Lukas Baltrenas, Vilnius (LT)

(73) Assignee: Oversec, UAB, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 17/724,980

(22) Filed: Apr. 20, 2022

Related U.S. Application Data

(63) Continuation of application No. 17/677,461, filed on Feb. 22, 2022, now Pat. No. 11,444,911.

(51) Int. Cl.
*H04L 61/4511* (2022.01)
*H04L 12/46* (2006.01)

(52) U.S. Cl.
CPC ...... *H04L 61/4511* (2022.05); *H04L 12/4633* (2013.01); *H04L 12/4641* (2013.01)

(58) Field of Classification Search
CPC ............. H04L 61/4511; H04L 12/4633; H04L 12/4641
See application file for complete search history.

(56) References Cited

U.S. PATENT DOCUMENTS

| | | | |
|---|---|---|---|
| 7,970,765 B1 * | 6/2011 | Olsen | H04L 61/58 707/737 |
| 8,156,199 B1 * | 4/2012 | Hoche-Mong | H04L 63/0272 709/224 |
| 8,543,665 B2 | 9/2013 | Ansari et al. | |
| 9,319,300 B2 | 4/2016 | Huynh Van et al. | |
| 9,912,630 B2 | 3/2018 | Chan et al. | |
| 9,923,918 B2 | 3/2018 | Nicodemus et al. | |
| 10,051,002 B2 | 8/2018 | Jain et al. | |
| 10,122,676 B2 * | 11/2018 | Lapidous | H04L 63/0272 |
| 10,142,293 B2 | 11/2018 | Hoy et al. | |
| 10,270,740 B2 | 4/2019 | Agarwal et al. | |
| 10,771,396 B2 | 9/2020 | Osterlund et al. | |
| 10,931,561 B2 * | 2/2021 | Parla | H04L 45/04 |
| 11,316,787 B2 | 4/2022 | Branch et al. | |
| 11,363,062 B1 * | 6/2022 | Celiesius | H04L 63/1475 |
| 11,425,091 B1 | 8/2022 | Dowdy et al. | |

(Continued)

*Primary Examiner* — Blake J Rubin
(74) *Attorney, Agent, or Firm* — Young Basile Hanlon & MacFarlane, P.C.

(57) ABSTRACT

Domain name system (DNS) configuration during virtual private network (VPN) connection includes, by a VPN entry server, receiving from a client device, via a VPN tunnel between the entry server and the client device, a first request for first content that identifies a first external source for the first content, receiving, from an operative DNS server configured for the tunnel, an Internet Protocol (IP) address of a first VPN system exit server, in response to determining that the first content is unavailable via the first system exit server, identifying a second DNS server, such that a second VPN system exit server for obtaining the first content is available using the second DNS server, obtaining, from the second system exit server, the first content, wherein the second system exit server obtained the first content from the first external source, and transmitting, to the client device, via the tunnel, the first content.

20 Claims, 12 Drawing Sheets

(56) References Cited

U.S. PATENT DOCUMENTS

| | | |
|---|---|---|
| 11,444,911 B1 | 9/2022 | Baltrenas |
| 2006/0288408 A1 | 12/2006 | Wesinger et al. |
| 2012/0005476 A1 | 1/2012 | Wei et al. |
| 2013/0179551 A1 | 7/2013 | Li |
| 2013/0182651 A1 | 7/2013 | Kelkar et al. |
| 2013/0332986 A1 | 12/2013 | Sima et al. |
| 2015/0372982 A1* | 12/2015 | Herle .................. H04L 63/0272 726/15 |
| 2016/0241509 A1 | 8/2016 | Akcin |
| 2016/0294631 A1 | 10/2016 | Byrnes et al. |
| 2016/0337104 A1* | 11/2016 | Kalligudd ........... H04L 12/4641 |
| 2017/0064749 A1 | 3/2017 | Jain et al. |
| 2017/0086092 A1 | 3/2017 | Kim et al. |
| 2017/0111269 A1 | 4/2017 | Baumgartner et al. |
| 2018/0013583 A1 | 1/2018 | Rubenstein et al. |
| 2018/0091417 A1 | 3/2018 | Ore et al. |
| 2018/0270201 A1* | 9/2018 | Chanak ............... H04L 67/1021 |
| 2018/0309658 A1 | 10/2018 | Parla et al. |
| 2019/0173848 A1* | 6/2019 | Lapidous ............ H04L 63/0428 |
| 2019/0327205 A1 | 10/2019 | Saidumuhamed et al. |
| 2019/0342266 A1 | 11/2019 | Ramachandran et al. |
| 2020/0213265 A1 | 7/2020 | Deshpande et al. |
| 2020/0304459 A1 | 9/2020 | Konda, Jr. et al. |
| 2020/0313929 A1* | 10/2020 | Rudnik ............... H04L 61/4511 |
| 2020/0314067 A1 | 10/2020 | Rudnik |
| 2020/0403963 A1 | 12/2020 | Chen |
| 2022/0029966 A1 | 1/2022 | Park et al. |
| 2022/0070717 A1* | 3/2022 | Lutz ....................... H04L 43/16 |
| 2022/0103523 A1* | 3/2022 | Starr .................. H04L 63/0272 |
| 2022/0116484 A1* | 4/2022 | Cunningham .......... H04L 43/08 |
| 2022/0141191 A1* | 5/2022 | Mehta ................. H04L 63/0236 726/15 |
| 2022/0278889 A1* | 9/2022 | Malleshaiah ....... H04L 41/0631 |
| 2022/0286431 A1 | 9/2022 | Winn et al. |
| 2022/0294698 A1* | 9/2022 | Opsenica ............ H04L 12/4633 |
| 2022/0337480 A1* | 10/2022 | Vanajakshi ............. H04L 41/16 |
| 2022/0337547 A1* | 10/2022 | Dinha ................ H04L 63/0272 |
| 2022/0368675 A1* | 11/2022 | Narula ............... H04L 43/0817 |
| 2022/0417218 A1 | 12/2022 | Purta |

\* cited by examiner

DOMAIN NAME SYSTEM CONFIGURATION DURING VIRTUAL PRIVATE NETWORK CONNECTION

CROSS-REFERENCE TO RELATED APPLICATION(S)

This application is a continuation of U.S. application patent Ser. No. 17/677,461, filed Feb. 2, 2022, the entire disclosure of which is hereby incorporated by reference.

BACKGROUND

Computing devices, and users thereof, use virtual private network (VPN) services for privacy, to circumvent censorship, to access geo-filtered content, or a combination thereof.

SUMMARY

Disclosed herein are implementations of domain name system configuration during virtual private network connection.

An aspect of the disclosure is a method for domain name system configuration during virtual private network connection. Domain name system configuration during virtual private network connection includes receiving, by a virtual private network entry server, from a client device, via a virtual private network tunnel between the virtual private network entry server and the client device, a first request for first content, wherein the first request identifies a first external source for the first content, receiving, by the virtual private network entry server, from an operative domain name system server configured for the virtual private network tunnel, an Internet Protocol (IP) address of a first virtual private network system exit server, determining, by the virtual private network entry server, that the first content is unavailable via the first virtual private network system exit server, in response to determining that the first content is unavailable via the first virtual private network system exit server, identifying, by the virtual private network entry server, a second domain name system server, such that a second virtual private network system exit server for obtaining the first content is available using the second domain name system server, obtaining, by the virtual private network entry server, from the second virtual private network system exit server, the first content, wherein the second virtual private network system exit server obtained the first content from the first external source, and transmitting, to the client device, via the virtual private network tunnel, the first content.

In the aspects described herein, prior to receiving the first request, establishing the virtual private network tunnel, wherein establishing the virtual private network tunnel includes receiving, from the client device, virtual private network configuration data indicating a first domain name system server configured as the operative domain name system server for the virtual private network tunnel; receiving the first request includes receiving a request to establish the virtual private network tunnel, and receiving virtual private network configuration data indicating a first domain name system server configured as the operative domain name system server for the virtual private network tunnel; wherein, to identify the first external source, the first request includes a universal resource locator (URL) value indicative of the first external source, and, prior to receiving the IP address, transmitting, to the operative domain name system server, the URL value; wherein obtaining the first content includes transmitting, by the virtual private network entry server, to the client device, via the virtual private network tunnel, a domain name system configuration message, wherein the domain name system configuration message indicates the second domain name system server, such that the client device configures the second domain name system server as the operative domain name system server for the virtual private network tunnel; receiving, by the virtual private network entry server, from the client device, via the virtual private network tunnel, a second request for second content that identifies a second external source for the second content; determining, by the virtual private network entry server, that a third virtual private network system exit server for obtaining the second content from the second external source is available using the operative domain name system server, and in response to determining that the third virtual private network system exit server for obtaining the second content from the second external source is available using the operative domain name system server, obtaining, by the virtual private network entry server, from the third virtual private network system exit server, the second content, wherein the third virtual private network system exit server obtained the second content from the second external source, and transmitting, to the client device, via the virtual private network tunnel, the second content, such that the client device omits reconfiguring the operative domain name system server to obtain the second content; wherein the second request is received prior to receiving the first request, such that obtaining the second content is performed wherein the operative domain name system server is the first domain name system server; wherein, the first request is received prior to receiving the second request, such that obtaining the second content is performed wherein the operative domain name system server is the second domain name system server.

Another aspect of the disclosure is an apparatus of a service provider infrastructure system. The apparatus includes a non-transitory computer-readable storage medium, and a processor that executes instructions stored in the non-transitory computer-readable storage medium to perform domain name system configuration during virtual private network connection. To perform domain name system configuration during virtual private network connection the processor executes the instructions stored in the non-transitory computer-readable storage medium to receive, from a client device, via a virtual private network tunnel between the virtual private network entry server and the client device, a first request for first content, wherein the first request identifies a first external source for the first content, receive, from an operative domain name system server configured for the virtual private network tunnel, an Internet Protocol (IP) address of a first virtual private network system exit server, determine that the first content is unavailable via the first virtual private network system exit server, in response to determining that the first content is unavailable via the first virtual private network system exit server, identify a second domain name system server, such that a second virtual private network system exit server for obtaining the first content is available using the second domain name system server, obtain, from the second virtual private network system exit server, the first content, wherein the second virtual private network system exit server obtained the first content from the first external source, and transmit, to the client device, via the virtual private network tunnel, the first content.

In the aspects described herein, wherein, prior to receiving the first request, the processor executes the instructions to establish the virtual private network tunnel, wherein to establish the virtual private network tunnel the processor executes the instructions to receive, from the client device, virtual private network configuration data indicating a first domain name system server configured as the operative domain name system server for the virtual private network tunnel; wherein, to receive the first request, the processor executes the instructions to receive a request to establish the virtual private network tunnel, and receive virtual private network configuration data indicating a first domain name system server configured as the operative domain name system server for the virtual private network tunnel; wherein, to identify the first external source, the first request includes a universal resource locator (URL) value indicative of the first external source, and prior to receiving the IP address, the processor executes the instructions to transmit, to the operative domain name system server, the URL value; wherein to obtain the first content the processor executes the instructions to transmit, to the client device, via the virtual private network tunnel, a domain name system configuration message, wherein the domain name system configuration message indicates the second domain name system server, such that the client device configures the second domain name system server as the operative domain name system server for the virtual private network tunnel; wherein the processor executes the instructions to receive, from the client device, via the virtual private network tunnel, a second request for second content that identifies a second external source for the second content, determine that a third virtual private network system exit server for obtaining the second content from the second external source is available using the operative domain name system server, and in response to determining that the third virtual private network system exit server for obtaining the second content from the second external source is available using the operative domain name system server, obtain, from the third virtual private network system exit server, the second content, wherein the third virtual private network system exit server obtained the second content from the second external source, and transmit, to the client device, via the virtual private network tunnel, the second content, such that the client device omits reconfiguring the operative domain name system server to obtain the second content; wherein the second request is received prior to receiving the first request, such that to obtain the second content the processor executes the instructions wherein the operative domain name system server is the first domain name system server, wherein the first request is received prior to receiving the second request, such that to obtain the second content the processor executes the instructions wherein the operative domain name system server is the second domain name system server.

Another aspect of the disclosure is a non-transitory computer-readable storage medium, comprising executable instructions that, when executed by a processor, perform domain name system configuration during virtual private network connection. Domain name system configuration during virtual private network connection includes receiving, by a virtual private network entry server, from a client device, via a virtual private network tunnel between the virtual private network entry server and the client device, a first request for first content, wherein the first request identifies a first external source for the first content, receiving, by the virtual private network entry server, from an operative domain name system server configured for the virtual private network tunnel, an Internet Protocol (IP) address of a first virtual private network system exit server, determining, by the virtual private network entry server, that the first content is unavailable via the first virtual private network system exit server, in response to determining that the first content is unavailable via the first virtual private network system exit server, identifying, by the virtual private network entry server, a second domain name system server, such that a second virtual private network system exit server for obtaining the first content is available using the second domain name system server, obtaining, by the virtual private network entry server, from the second virtual private network system exit server, the first content, wherein the second virtual private network system exit server obtained the first content from the first external source, and transmitting, to the client device, via the virtual private network tunnel, the first content.

In the aspects described herein, domain name system configuration during virtual private network connection may include receiving, by the virtual private network entry server, from the client device, via the virtual private network tunnel, a second request for second content that identifies a second external source for the second content, determining, by the virtual private network entry server, that a third virtual private network system exit server for obtaining the second content from the second external source is available using the operative domain name system server, and in response to determining that the third virtual private network system exit server for obtaining the second content from the second external source is available using the operative domain name system server obtaining, by the virtual private network entry server, from the third virtual private network system exit server, the second content, wherein the third virtual private network system exit server obtained the second content from the second external source, and transmitting, to the client device, via the virtual private network tunnel, the second content, such that the client device omits reconfiguring the operative domain name system server to obtain the second content; the second request is received prior to receiving the first request, such that obtaining the second content is performed wherein the operative domain name system server is the first domain name system server; and the first request is received prior to receiving the second request, such that obtaining the second content is performed wherein the operative domain name system server is the second domain name system server.

These and other objects, features, and characteristics of the apparatus, system, and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
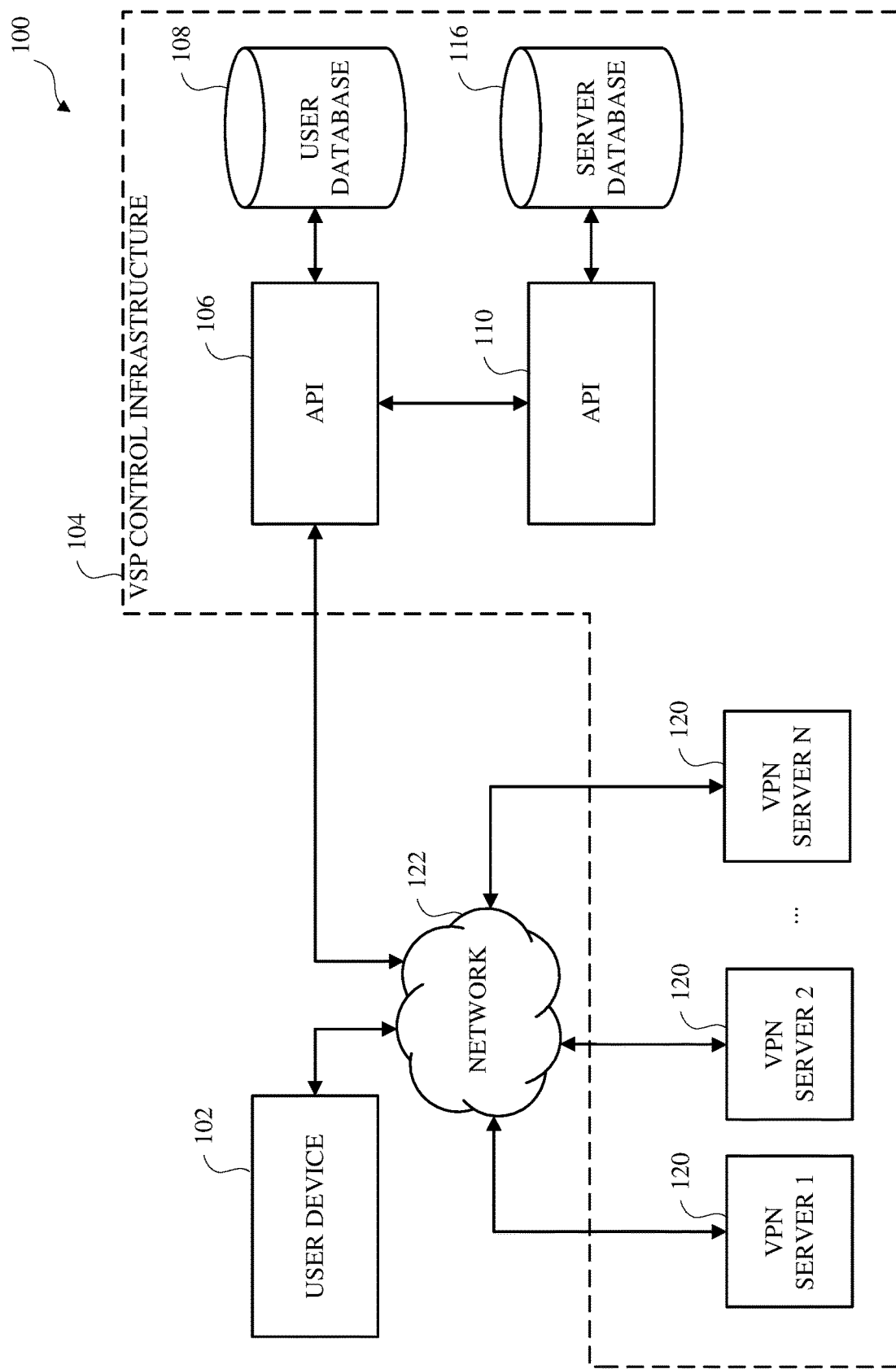
FIG. 1 is a block diagram of an example system associated with providing a split-configuration virtual private network.

Global Internet users increasingly rely on VPN services to preserve their privacy, to circumvent censorship, and/or to access geo-filtered content. Originally developed as a technology to privately send and receive data across public networks, VPNs are now used broadly as a privacy-preserving technology that allows Internet users to obscure not only the communicated data but also personal information such as, for example, web browsing history from third parties including Internet service providers (ISPs), Spywares, or the like. A VPN service provider may offer a secure private networking environment within a publicly shared, insecure infrastructure through encapsulation and encryption of the data communicated between a VPN client application (or VPN application) installed on a user device and a remote VPN server.

Most VPN providers rely on a tunneling protocol to create the secure private networking environment, which adds a layer of security to protect each IP packet of the communicated data during communication over the Internet. Tunneling may be associated with enclosing an entire IP packet within an outer IP packet to form an encapsulated IP packet, and transporting the enclosed IP packet over the Internet. The outer IP packet may protect contents of the enclosed IP packet from public view by ensuring that the enclosed IP packet is transmitted over the Internet within a virtual tunnel. Such a virtual tunnel may be a point-to-point tunnel established between the user device and the VPN server. The process of enclosing the entire IP packet within the outer IP packet may be referred to as encapsulation. Computers, servers, or other network devices at ends of the virtual tunnel may be referred to as tunnel interfaces and may be capable of encapsulating outgoing IP packets and of unwrapping incoming encapsulated IP packets.

Encryption may be associated with changing the data from being in a transparently readable format to being in an encoded, unreadable format with help of an encryption algorithm. Decryption may be associated with changing the data from being in the encoded, unreadable format to being in the transparently readable format with help of a decryption algorithm. In an example, encoded/encrypted data may be decoded/decrypted with only a correct decryption key. In a VPN, encryption may render the communicated data unreadable or indecipherable to any third party. At a basic level, when the user launches the installed VPN application and connects to the VPN server, the VPN application may encrypt all contents of the data before transmission over the Internet to the VPN server. Upon receipt, the VPN server may decrypt the encrypted data and forward the decrypted data to an intended target via the Internet. Similarly, the VPN server may encrypt all contents of the data before transmission over the Internet to the user device. Upon receipt, the VPN application on the user device may decrypt the encrypted data and provide the decrypted data to the user.

VPNs generally use different types of encryption and decryption algorithms to encrypt and decrypt the communicated data. Symmetric encryption may utilize encryption and decryption algorithms that rely on a single private key for encryption and decryption of data. Symmetric encryption is considered to be relatively speedy. One example of an encryption and decryption algorithm utilized by symmetric encryption may be an AES encryption cipher. Asymmetric encryption, on the other hand, may utilize encryption and decryption algorithms that rely on two separate but mathematically-related keys for encryption and decryption of data. In one example, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

In a VPN, keys for encryption and decryption may be randomly generated strings of bits. Each key may be generated to be unique. A length of an encryption key may be given by a number of the randomly generated string bits, and the longer the length of the encryption key, the stronger is the encryption.

VPNs may employ user authentication, which may involve verification of credentials required to confirm authenticity/identity of the user. For instance, when a user launches the VPN application to request a VPN connection, the VPN service provider may authenticate the user device prior to providing the user device with access to VPN services. In this way, user authentication may provide a form of access control. Typically, user authentication may include verification of a unique combination of a user ID and password. To provide improved security in the VPN, user authentication may include additional factors such as knowledge, possession, inheritance, or the like. Knowledge factors may include items (e.g., pin numbers) that an authentic user may be expected to know. Possession factors may include items (e.g., one-time password (OTP) tokens) that an authentic user may be expected to possess at a time associated with the authentication. Inherent factors may include biometric items (e.g., fingerprint scans, retina scans, iris scans, or the like) that may be inherent traits of an authentic user.

A VPN may be associated with a network of VPN servers, typically deployed in various geographic locations. A VPN server may be a physical server or a virtual server configured to host and/or globally deliver VPN services to the user. A server may be a combination of hardware and software, and may include logical and physical communication ports. When launched, the VPN application may connect with a selected VPN server for secure communication of data via the virtual tunnel.

The VPN application, installed on the user device, may utilize software-based technology to establish a secure connection between the user device and a VPN server. Some VPN applications may automatically work in the background on the user device while other VPN applications may include front-end interfaces to allow the user to interact with and configure the VPN applications. VPN applications may often be installed on a computer (e.g., user device), though some entities may provide a purpose-built VPN application as a hardware device that is pre-installed with software to enable the VPN. Typically, a VPN application may utilize one or more VPN protocols to encrypt and decrypt the communicated data. Some commonly used VPN protocols may include OpenVPN, SSTP, PPTP, L2TP/IPsec, SSL/TLS, Wireguard, IKEv2, and SoftEther.

FIG. 1 is a block diagram of an example system associated with providing a split-configuration virtual private network. Example 100 shows an architectural depiction of components included in system 100. In some aspects, the components may include a user device 102 capable of communicating with one or more VPN servers 120 and with a VPN service provider (VSP) control infrastructure 104 over a network 122. The VSP control infrastructure 104 may be controlled by a VPN service provider and may include an application programming interface (API) 106, a user database 108, processing unit 110, a server database 116, and the one or more VPN servers 120. As shown in FIG. 1, the API 106 may be capable of communicating with the user database 108 and with the processing unit 110. Additionally, the processing unit 110 may be capable of communicating with the server database, which may be capable of communicating with a testing module (not shown). The testing module may be capable of communicating with the one or more VPN servers 120 over the network 122. The processing unit 110 may be capable of controlling operation of the one or more VPN servers 120.

The user device 102 may be a physical computing device capable of hosting a VPN application and of connecting to the network 122. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The network 122 may be any digital telecommunication network that permits several nodes to share and access resources. In some aspects, the network 122 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The VSP control infrastructure 104 may include a combination of hardware and software components that enable provision of VPN services to the user device 102. The VSP control infrastructure 104 may interface with (the VPN application on) the user device 102 via the API 106, which may include one or more endpoints to a defined request-response message system. In some aspects, the API 106 may be configured to receive, via the network 122, a connection request from the user device 102 to establish a VPN connection with a VPN server 120. The connection request may include an authentication request to authenticate the user device 102 and/or a request for an IP address of an optimal VPN server for establishment of the VPN connection therewith. In some aspects, an optimal VPN server may be a single VPN server 120 or a combination of one or more VPN servers 120. The API 106 may receive the authentication request and the request for an IP address of an optimal VPN server in a single connection request. In some aspects, the API 106 may receive the authentication request and the request for an IP address of an optimal VPN server in separate connection requests.

The API 106 may further be configured to handle the connection request by mediating the authentication request. For instance, the API 106 may receive from the user device 102 credentials including, for example, a unique combination of a user ID and password for purposes of authenticating the user device 102. In another example, the credentials may include a unique validation code known to an authentic user. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The VPN service provider may add or delete such valid unique combinations of user IDs and passwords from the structured repository at any time. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the VPN service provider may provide VPN services to the user device 102. When the received credentials fail to match at least one of the valid credentials, the user database 108 and the processor may fail to authenticate the user device 102. In this case, the VPN service provider may decline to provide VPN services to the user device 102.

When the user device 102 is authenticated, the user device 102 may initiate a VPN connection and may transmit to the API 106 a request for an IP address of an optimal VPN server. The processing unit 110 included in the VSP control infrastructure may be configured to determine/identify a single VPN server 120 as the optimal server or a list of VPN servers. The processing unit 110 may utilize the API 106 to transmit the IP address of the optimal server or IP addresses of the VPN servers 120 included in the list to the user device 102. In the case where the list of IP addresses of the VPN servers 120 is provided, the user device 102 may have an option to select a single VPN server 120 from among the listed VPN servers as the optimal server 120. The user device 102 may transmit an initiation request to establish a VPN connection (e.g., an encrypted tunnel) with the optimal VPN server. In some aspects, the optimal VPN server with which the user device establishes the encrypted tunnel may be referred to as a primary VPN server or an entry VPN server. In some aspects, a VPN server 120 may be a piece of physical or virtual computer hardware and/or software capable of securely communicating with (the VPN application on) the user device 102 for provision of VPN services.

The processing unit 110 may be a logical unit including a scoring engine 112. The processing unit 110 may include a logical component configured to perform complex operations to compute numerical weights related to various factors associated with the VPN servers 120. The scoring engine may likewise include a logical component configured to perform arithmetical and logical operations to compute a server penalty score for one or more of the VPN servers 120.

In some aspects, based at least in part on server penalty scores calculated via the complex operations and/or the arithmetical and logical operations, the processing unit 110 may determine an optimal VPN server. In one example, the processing unit 110 may determine the VPN server 120 with the lowest server penalty score as the optimal VPN server. In another example, the processing unit 110 may determine the list of optimal VPN servers by including, for example, three (or any other number) VPN servers 120 with the three lowest server penalty scores.

One or more components (e.g., API 106, user database 108, processing unit 110, and/or server database 116) included in the VSP control infrastructure 104 may further be associated with a controller/processor, a memory, or a combination thereof. For instance, the one or more components of the set of components may include or may be included in a controller/processor, a memory, or a combination thereof. In some aspects, the one or more of the components included in the VSP control infrastructure 104 may be separate and distinct from each other. Alternatively, in some aspects, one or more of the components included in the VSP control infrastructure 104 may be combined with one or more of other components included in the VSP control infrastructure 104. In some aspects, the one or more of the components included in the VSP control infrastructure 104 may be local with respect to each other. Alternatively, in some aspects, one or more of the components included in the VSP control infrastructure 104 may be located remotely with respect to one or more of other components included in the VSP control infrastructure 104. Additionally, or alternatively, one or more components of the components included in the VSP control infrastructure 104 may be implemented at least in part as software stored in a memory. For example, a component (or a portion of a component) may be implemented as instructions or code stored in a non-transitory computer-readable medium and executable by a controller or a processor to perform the functions or operations of the component. Additionally, or alternatively, a set of (one or more) components shown in FIG. 1 may be configured to perform one or more functions described as being performed by another set of components shown in FIG. 1.

As indicated above, FIG. 1 is provided as an example. Other examples may differ from what is described with regard to FIG. 1.

A user device may receive remote content via a VPN network. Remote content may include content that is unavailable in a geographic location where the user device is located. Remote content may also include multimedia content such as audio content, video content, audio-video content, image content, or the like and/or non-multimedia content such as textual data, textual information, or the like. The user device may receive the remote multimedia content via streaming, which may include real-time reception and rendering of the remote multimedia content on the user device.

To receive the remote content via the VPN network, the user device may request VPN services from a VSP control infrastructure. The VSP control infrastructure may suggest a VPN server for providing VPN services to the user device. The VPN server may be an optimal VPN server for providing VPN services to the user device because, for example, the VPN server may be located geographically/physically closer (and therefore able to provide speedier service) to the user device as compared to the other VPN servers. The user device may establish a VPN connection with the VPN server.

During the established VPN connection, the user device may transmit a remote content request for requesting the VPN server to provide the remote content. Based at least in part on receiving the remote content request, the VPN server may utilize an associated domain name services (DNS) server to reach an exchange point to obtain the remote content. The associated DNS server may be a default DNS server utilized by the VPN server to service all received requests (e.g., requests for remote content, requests for local content, or the like). In an example, the DNS server may be local to the VPN server and/or may be included within the VPN server, thereby enabling speedy DNS services to the VPN server.

The default DNS server may fail to enable the VPN server to reach an exchange point capable of obtaining the remote content. For instance, the default DNS server may be limited to providing an access Internet protocol (IP) address of an exchange point that is not be capable of obtaining the remote content. An exchange point may not be capable of obtaining the remote content because, for example, the exchange point is associated with a VPN server and/or the exchange point is located in a geographic location (which may be similar to a location of the VPN server and/or a location of the user device) where the remote content is unavailable. For instance, an exchange point may utilize a proxy IP address to obtain the remote content. A content provider of the remote content may decline to provide the remote content to the exchange point based on evaluating the proxy IP address and determining that the exchange point is associated with a VPN server. Additionally, or alternatively, the content provider may decline to provide the remote content to the exchange point based on evaluating the proxy IP address and determining that the exchange point is located in a geographical location where the remote content is unavailable. As a result, the DNS server may be unable to provide an access IP address of an exchange point capable of obtaining the remote content. Consequently, the VPN server may be unable to provide the remote content to the user device.

To receive the remote content, the user device may disconnect the established VPN connection with the VPN server and establish a new VPN connection with a new VPN server. The user device may select the new VPN server, from a list of VPN servers presented by the VSP control infrastructure, based on the new VPN server being associated with a default DNS server that is able to provide an access IP address of an exchange point capable of obtaining the remote content (e.g., located in a geographic location where the remote content is available).

Such new VPN server may be located at a threshold distance away from the user device. As a result, the VPN connection with the new VPN server may include a plurality of nodes and/or routers. For at least this reason, the new VPN server may be unable to provide the user device with speedy service, which may be essential for streaming remote multimedia content. The user device may be unable to adequately stream the remote multimedia content. Additionally, disconnecting the established VPN connection and establishing the new VPN connection may inefficiently consume user device resources (e.g., processing resources, memory resources, power consumption resources, battery life, or the like) and resources associated with the VPN (computational resources, network bandwidth, management resources, processing resources, memory resources, or the like) that can otherwise be used to perform suitable tasks associated with the VPN. Also, based on a threshold amount of user devices connecting to the new VPN server to receive the remote content, the new VPN server may become overloaded, thereby consuming the resources associated with the VPN that may otherwise be used for suitable tasks associated with the VPN.

Various aspects of systems and techniques discussed in the present disclosure enable providing a split-configuration VPN. In some aspects, providing a split-configuration may include a VSP control infrastructure configuring a VPN server to utilize a first DNS server to service remote content requests requesting remote content and a second DNS server (e.g., default DNS server) to service local content requests requesting local content. Local content may include content that is available in a geographic location where the user device (and/or the VPN server) is located. In some aspects, the VPN server may be configured to receive, from the user device, remote content information indicating parameters associated with the remote content. The VPN server may receive the remote content information along with an initiation request from the user device requesting to establish a VPN connection with the VPN server. Based at least in part on the remote content information, the VPN server may configure the VPN connection to be associated with one or more remote DNS servers that may enable the VPN server to reach an exchange point capable of obtaining the remote content. In some aspects, the exchange point may be capable of obtaining the remote content based at least in part on being located in a geographic location where the remote content is available. During the VPN connection, the VPN server may transmit at least a portion of the remote content information to enable the exchange point to obtain the remote content.

In this way, the VSP control infrastructure may configure the VPN server to receive the remote content and to provide the remote content to the user device without the user device disconnecting an established VPN connection with the VPN server and establishing a new VPN connection with a new VPN server. As a result, efficient consumption of user device resources and resources associated with the VPN may be enabled. Additionally, because the VPN server may be an optimal VPN server to provide VPN services to the user device, the user device may receive speedier service as compared to the new VPN server. Also, overloading of the new VPN server by users receiving the remote content may be avoided, thereby conserving resources associated with the VPN.

In some aspects, a processing unit (e.g., processing unit 110) included in the VSP control infrastructure may configure a VPN server to receive an initiation request from a user device to establish a VPN connection, the initiation request including remote content information associated with remote content; and to transmit at least a portion of the remote content information to a remote domain name services (DNS) server to enable the remote DNS server to provide an access internet protocol (IP) address associated with a first exchange point that is capable of obtaining the remote content.

Figure 2:
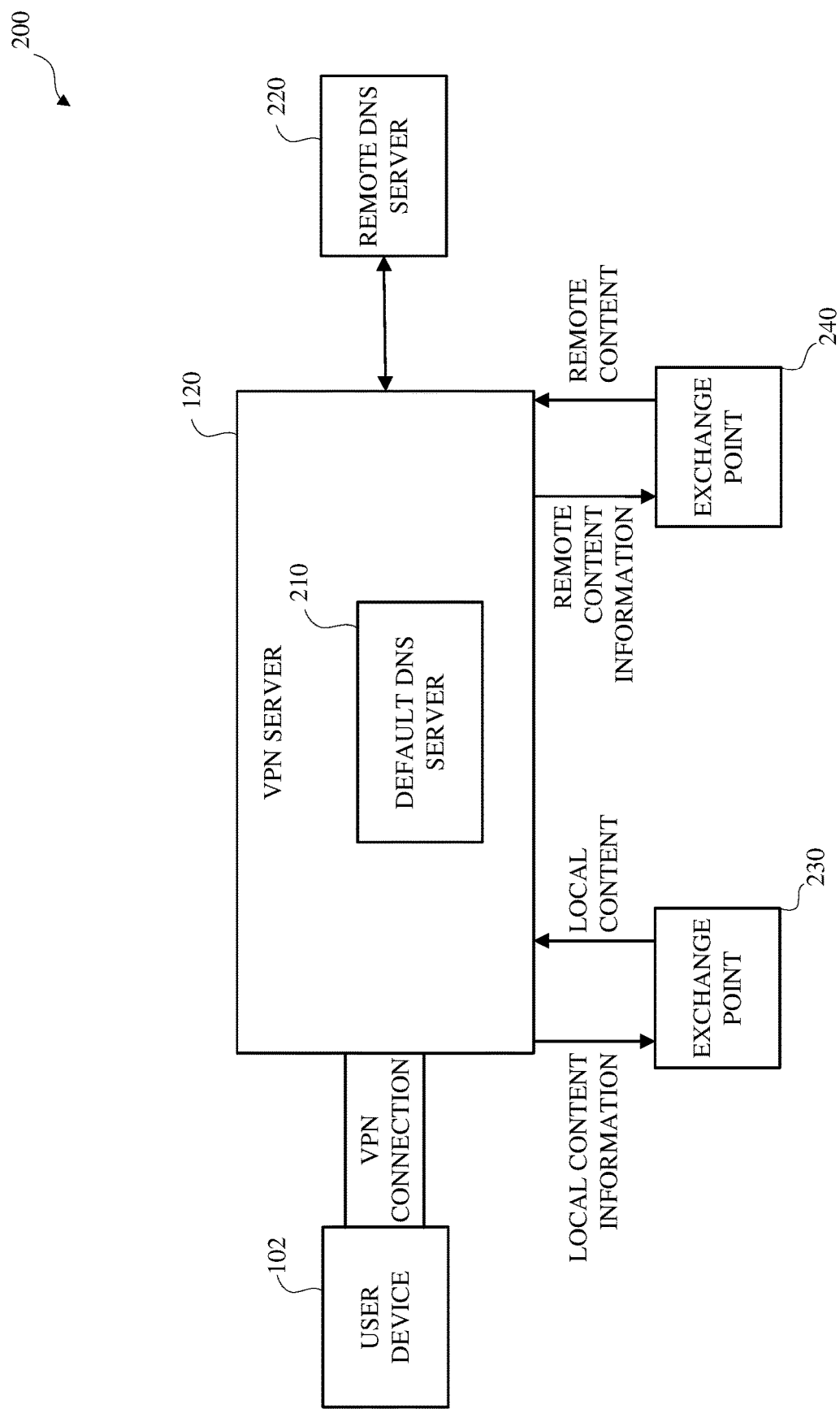
FIG. 2 is a block diagram of an example system associated with providing a split-configuration virtual private network.

FIG. 2 is an illustration of an example system 200 associated with providing a split-configuration VPN, according to various aspects of the present disclosure. The example system 200 may include a user device 102, a VPN server 120 associated with a default DNS server 210, one or more remote DNS servers 220, an exchange point 230, and an exchange point 240. The default DNS server 210 may be local to the VPN server 120 and/or may be included within the VPN server 120, thereby enabling speedy DNS services to the VPN server 120 with respect to obtaining local content. The one or more remote DNS servers 220 may be located remotely with respect to the VPN server 120 and may enable the VPN server 120 to obtain remote content. The VPN server 120 may be configured by a VSP control infrastructure (not shown) to provide VPN services to the user device 102. In some aspects, the exchange point 230 and the exchange point 240 may include, or may be included within, a proxy server.

The user device 102 may undergo an authentication process with a VSP control infrastructure (e.g., VSP control infrastructure) to receive VPN services via a VPN network. Such VPN services may include receiving remote content and receiving local content. Remote content may include content unavailable in a geographic location associated with the user device 102 and/or the VPN server 120. Local content may include content available in the geographic location associated with the user device 102 and/or the VPN server 120. Remote content may include remote multimedia content such as, for example, audio content, video content, audio-video content, images, animations, slideshows, interactive gaming media, low-latency applications such as gambling applications, or the like and/or may include remote data content such as, for example, textual data, textual information, or the like. The user device 102 may receive remote multimedia content via streaming, which may include real-time reception and rendering of the remote multimedia content on the user device 120 and/or on a device associated with the user device 120. As such, streaming may enable low-latency, instantaneous distribution and reception of the remote multimedia content. Local content may include local multimedia content and/or local data content. The local multimedia content may be similar to remote multimedia content and the local data content may be similar to the remote data content.

Upon authentication of the user device 102, the VSP control infrastructure may enable the user device 102 to establish a VPN connection with the VPN server 120, which may be an optimal VPN server for providing VPN services to the user device 102. In some aspects, the VPN server 120 may be the optimal server because, for example, because the VPN server 120 may be located geographically/physically closer (and therefore able to provide speedier service) to the user device 102 as compared to the other VPN servers, the VPN server 120 may have the highest available bandwidth to provide VPN services to the user device 102 as compared to the other VPN servers, and/or the VPN server 120 may be located geographically/physically closer to an international Internet exchange hub (and therefore able to provide speedier service) as compared to the other VPN servers.

To establish the VPN connection, the user device 102 may transmit, and the VPN server 120 may receive, an initiation request. Substantially simultaneously to receiving the initiation request, the VPN server 120 may receive remote content information. In some aspects, the remote content information may be included in the initiation request. In some aspects, the remote content information may be appended to a message including the initiation request. In some aspects, the remote content information and the initiation request may be received in separate communications. In some aspects, a client application installed on the user device 102 may enable the user device 102 to transmit the initiation request and the remote content information to the VPN server 120. The client application may include a graphical interface to accept remote content information via an input interface (e.g., touch screen, keyboard, mouse, pointer, etc.) associated with the user device 102. In some aspects, the client application may activate, at a time associated with transmitting the initiation request, the graphical interface for accepting remote content information. In some aspects, the graphical interface may present, for example, a pop-up menu on a screen associated with the user device 102 requesting entry of the remote content information via the input interface.

The remote content information may include information associated with the remote content that the user device 120 may receive. The remote content information may describe the remote content. In an example, the remote content information may indicate that the remote content is remote multimedia content (e.g., audio content, video content, audio-video content, etc.). In another example, the remote content information may identify a content provider of the remote content. For instance, the remote content information may indicate a domain name associated with the content provider. In yet another example, the remote content information may indicate a geographical location where the remote content is available.

Based at least in part on receiving the initiation request, the VPN server 120 may enable the user device 102 to establish a VPN connection with the VPN server 120. In some aspects, the VPN connection may be established using a VPN protocol such as, for example, proxy protocol v2, IP in IP (Protocol 4): IP in IPv4/IPv6; SIT/IPv6 (Protocol 41): IPv6 in IPv4/IPv6; GRE (Protocol 47): Generic Routing Encapsulation; OpenVPN (UDP port 1194); SSTP (TCP port 443): Secure Socket Tunneling Protocol; IPSec (Protocol 50 and 51): Internet Protocol Security; L2TP (Protocol 115): Layer 2 Tunneling Protocol; VXLAN (UDP port 4789): Virtual Extensible Local Area Network; WireGuard; Quic, and other available data communication protocols and their future iterations.

Further, based at least in part on the remote content information, the VPN server 120 may configure the VPN connection to be associated with one or more remote DNS servers 220 that may enable the VPN server 120 to reach an exchange point capable of obtaining the remote content. For instance, the VPN server 120 may configure the VPN connection to be associated with the one or more remote DNS servers 220 that can provide access IP addresses of exchange points (e.g., exchange point 240) capable of obtaining the remote content. In some aspects, such exchange points may be located in a geographic location where the remote content is available.

In some aspects, the one or more remote DNS servers 220 may have respective predetermined lists of exchange points for whom the one or more remote DNS servers 220 are capable of providing access IP addresses. The VPN server 120 may evaluate such predetermined lists to determine exchange points capable of obtaining the remote content to be received by the user device 102 and, therefore, select the one or more remote DNS servers 220 with which to associate the VPN connection. Such one or more remote DNS servers 220 may be separate from the default DNS server 210.

In an example, when a user device 102 located in a first geographical location (e.g., Sweden) transmits remote content information indicating that remote content available in a second geographical location (e.g., United States) may be received, the VPN server 120, which may be located in or near the first geographical location, may configure the VPN connection to be associated with one or more remote DNS servers 220 that can provide access IP addresses of exchange points located in or near the second geographical location where the remote content is available. The VPN server 120 may evaluate respective predetermined lists of exchange points associated with the one or more remote DNS servers 220 to determine exchange points located in or near the second geographical location (e.g., capable of obtaining the remote content) and, therefore, the one or more remote DNS servers 220 with which to associate the VPN connection.

Further, the VPN server 120 may configure DNS settings associated with the VPN connection such that when a remote content request for the remote content is received from the user device 102 during the VPN connection (e.g., after the VPN connection is established), the VPN server 120 may utilize the one or more remote DNS servers 220 to receive an access IP address for an exchange point (e.g., exchange point 240) located in or near the second geographical location where the remote content is available. In some aspects, the VPN server 120 may transmit at least a portion of the remote content information to the one or more remote DNS servers 220 to enable the one or more remote DNS servers 220 to provide an access IP address associated with the exchange point. In some aspects, the exchange point located in or near the second geographical location may utilize a proxy IP address associated with a proxy device (e.g., a laptop computer, a desktop computer, a smart phone, a tablet computer, or the like) that is also located in or near the second geographical location. As a result, the content provider may agree to provide the remote content to the exchange point based at least in part on evaluating the proxy IP address and determining that the exchange point is located in or near the second geographical location where the remote content is available. In this way, the VPN server 120 may enable the user device 102, that is located in the first geographical location where the remote content is unavailable, to receive the remote content via the exchange point located in or near the second geographical location where the remote content is available.

During the VPN connection, the VPN server 120 may receive a remote content request for the remote content. Based at least in part on receiving the remote content request, the VPN server 120 may communicate (e.g., transmit and/or receive) with the one or more remote DNS servers 220 to receive an access IP address associated with, for example, exchange point 240 (e.g., remote exchange point) that is located in a geographical location where the remote content is available. Based at least in part on receiving the access IP address associated with the exchange point 240, the VPN server 120 may transmit at least a portion of the remote content information and/or the remote content request to the exchange point 240. The exchange point 240 may utilize a proxy IP address associated with a proxy device that is also located in the geographical location where the remote content is available to obtain the remote content. Based at least in part on obtaining the remote content, the exchange point 240 may transmit, and the VPN server 120 may receive, the remote content. Based at least in part on receiving the remote content from the exchange point 240, the VPN server 120 may provide the remote content to the user device 102 via the VPN connection.

During the VPN connection, the VPN server 120 may also receive a local content request including local content information for requesting local content. In some aspects, the VPN server 120 may receive the local content request substantially simultaneously with the remote content request. In some aspects, the VPN server may receive the local content request at a different time with respect to the remote content request. Based at least in part on receiving the local content request and/or determining that the local content request is associated with local content, the VPN server 120 may select to utilize the default DNS server 210 to receive an access IP address associated with, for example, exchange point 230 (e.g., local exchange point) that is capable of obtaining the local content. Based at least in part on receiving the access IP address associated with the exchange point 230, the VPN server 120 may transmit at least a portion of the local content information and/or the local content request to the exchange point 230. The exchange point 230 may utilize a proxy IP address associated with a proxy device that is also located in the geographical location where the local content is available to obtain the local content. Based at least in part on obtaining the local content, the exchange point 230 may transmit, and the VPN server 120 may receive, the local content. Based at least in part on receiving the local content from the exchange point 230, the VPN server 120 may provide the local content to the user device 102 via the VPN connection.

In this way, by providing a split-configuration to utilize a remote DNS server to service remote content requests requesting remote content and a default DNS server to service local content requests requesting local content, a VPN server may enable a user device located in a geographical location, where the remote content is unavailable, to receive the remote content via the VPN connection. Additionally, the VPN server may provide the remote content to a user device without the user device disconnecting an established VPN connection with the VPN server and establishing a new VPN connection with a new VPN server. As a result, efficient consumption of user device resources and resources associated with the VPN may be enabled. Additionally, because the VPN server may be an optimal VPN server to provide VPN services to the user device, the user device may receive speedier service as compared to the new VPN server. Also, overloading of a VPN server (e.g., new VPN server) that is capable of providing the remote content may be avoided, thereby conserving resources associated with the VPN.

As indicated above, FIG. 2 is provided as an example. Other examples may differ from what is described with regard to FIG. 2.

Figure 3:
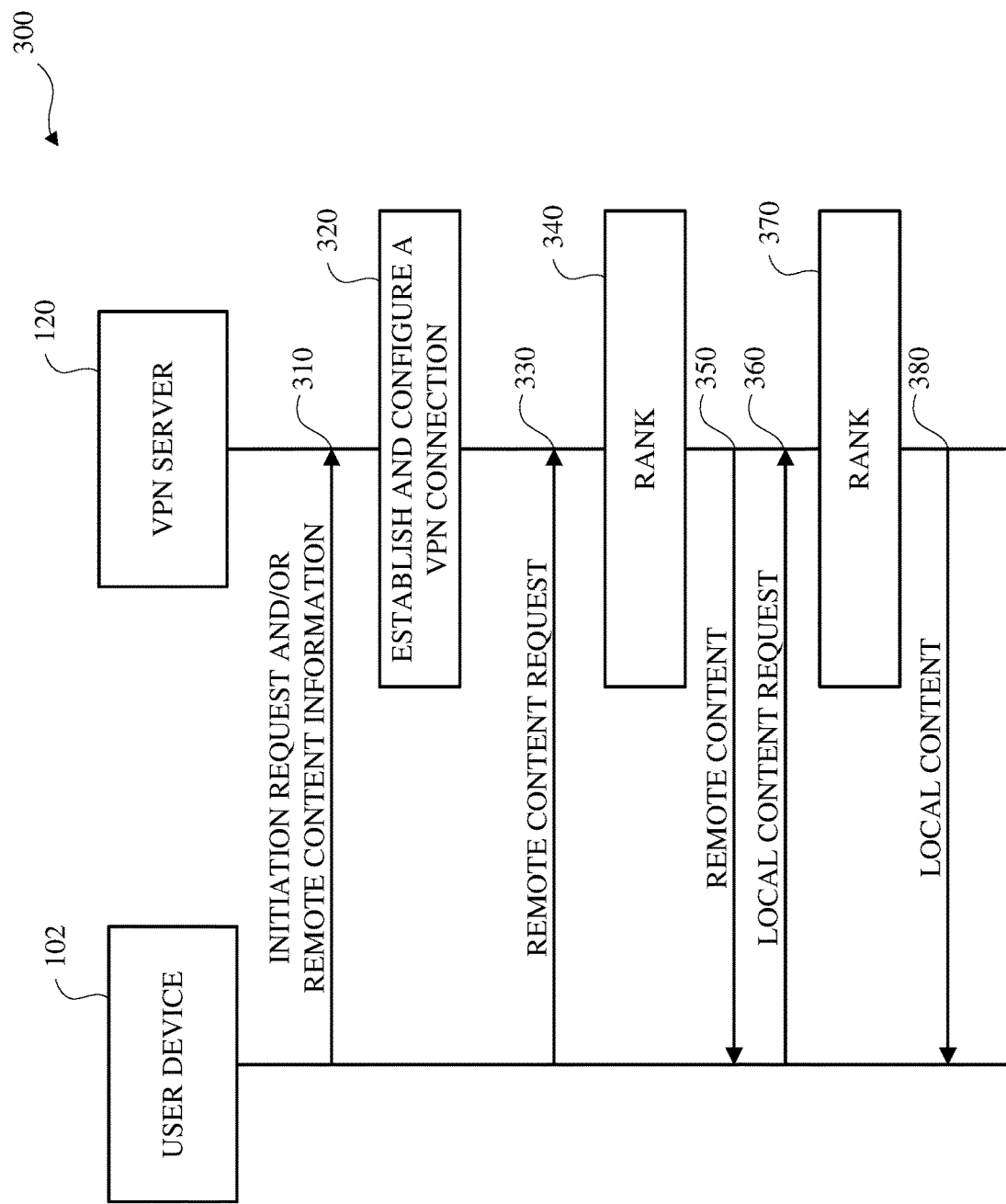
FIG. 3 is a flow diagram of an example flow associated with providing a split-configuration virtual private network.

FIG. 3 is an illustration of an example flow 300 associated with providing a split-configuration VPN, according to various aspects of the present disclosure. The example flow 300 may include a user device 102 in communication with a VPN server 120. In some aspects, as discussed elsewhere herein, a VSP control infrastructure associated with the VPN server 120 may configure the VPN server 120 to provide VPN services to the user device 102.

As shown by reference numeral 310, upon authentication of the user device 102, the VPN server 120 may receive an initiation request and/or remote content information to establish a VPN connection, as discussed elsewhere herein. Based at least in part on receiving the initiation request and/or the remote content information, as shown by reference numeral 320, the VPN server 120 may establish and configure the VPN connection. In some aspects, as discussed elsewhere herein, configuring the VPN connection may include associating the VPN connection with one or more remote DNS servers (e.g., remote DNS server 220) that may enable the VPN server 120 to reach an exchange point (e.g., exchange point 240) capable of obtaining the remote content. Further, as discussed elsewhere herein, configuring the VPN connection may include configuring DNS settings associated with the VPN connection such that when a remote content request for the remote content is received from the user device 102 during the VPN connection (e.g., after the VPN connection is established), the VPN server 120 may utilize the one or more remote DNS servers 220 to receive an access IP address for the exchange point capable of obtaining the remote content.

During the VPN connection, as shown by reference numeral 330, the VPN server 120 may receive a remote content request for the remote content. As shown by reference numeral 340, the VPN server 120 may receive the remote content by communicating with the exchange point capable of obtaining the remote content, as discussed elsewhere herein. Based at least in part on receiving the remote content, as shown by reference number 350, the VPN server 120 may provide the remote content to the user device 102 via the VPN connection as discussed elsewhere herein.

During the VPN connection, as shown by reference numeral 360, the VPN server 120 may receive a local content request for the local content. As shown by reference numeral 370, the VPN server 120 may receive the local content by communicating with the exchange point capable of obtaining the local content, as discussed elsewhere herein. Based at least in part on receiving the local content, as shown by reference number 380, the VPN server 120 may provide the local content to the user device 102 via the VPN connection as discussed elsewhere herein.

As indicated above, FIG. 3 is provided as an example. Other examples may differ from what is described with regard to FIG. 3.

Figure 4:
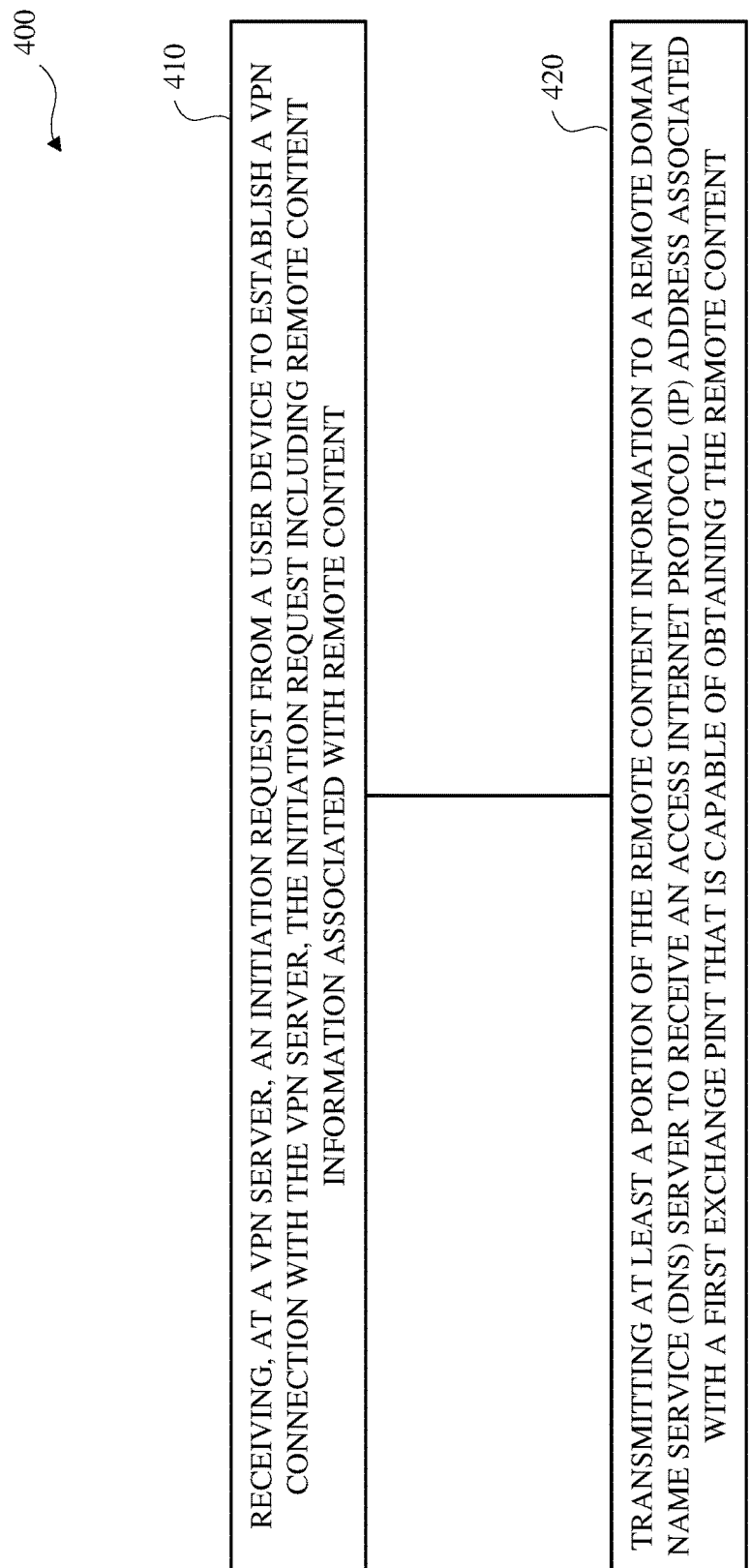
FIG. 4 is a flow diagram of an example process associated with providing a split-configuration virtual private network.

FIG. 4 is an illustration of an example process 400 associated with providing a split-configuration VPN, according to various aspects of the present disclosure. In some aspects, the process 400 may be performed by a memory (e.g., memory 730) and/or a processor (e.g., processor 720) associated with a VPN server (e.g., VPN server 120). As shown by reference numeral 410, process 400 may include receiving, at a VPN server, an initiation request from a user device to establish a VPN connection with the VPN server, the initiation request including remote content information associated with remote content. For instance, the VPN server may utilize a communication interface (e.g., communication interface 770) and the associated memory and/or processor to receive an initiation request from a user device to establish a VPN connection with the VPN server, the initiation request including remote content information associated with remote content, as discussed elsewhere herein.

As shown by reference numeral 420, process 400 may include transmitting at least a portion of the remote content information to a remote domain name services (DNS) server to enable the remote DNS server to provide an access internet protocol (IP) address associated with a first exchange point that is capable of obtaining the remote content. For instance, the VPN server may utilize the communication interface (e.g., communication interface 770) and the associated memory and/or processor to transmit at least a portion of the remote content information to a remote domain name services (DNS) server to enable the remote DNS server to provide an access internet protocol (IP)

address associated with a first exchange point that is capable of obtaining the remote content, as discussed elsewhere herein.

Process 400 may include additional aspects, such as any single aspect or any combination of aspects described below and/or in connection with one or more other processes described elsewhere herein.

In a first aspect, process 400 may include selecting the remote DNS server based at least in part on an association of the remote DNS server with the first exchange point that is capable of obtaining the remote content.

In a second aspect, alone or in combination with the first aspect, process 400 may include selecting the remote DNS server based at least in part on determining that the remote DNS server can provide the access IP address of the first exchange point.

In a third aspect, alone or in combination with the first through second aspects, process 400 may include receiving, from the remote DNS server, the access IP address associated with the first exchange point based at least in part on transmitting at least a portion of the remote content information to the remote DNS server.

In a fourth aspect, alone or in combination with the first through third aspects, process 400 may include receiving, during the VPN connection, a remote content request for the remote content; transmitting information associated with the remote content request to the first exchange point; receiving the remote content from the first exchange point; and transmitting the remote content to the user device.

In a fifth aspect, alone or in combination with the first through fourth aspects, in process 400, the remote content information indicates a geographical location where the remote content is available.

In a sixth aspect, alone or in combination with the first through fifth aspects, process 400 may include receiving, during the VPN connection, a local content request for the local content; transmitting information associated with the local content request to a second exchange point; receiving the local content from the second exchange point; and transmitting the local content to the user device.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

Figure 5:
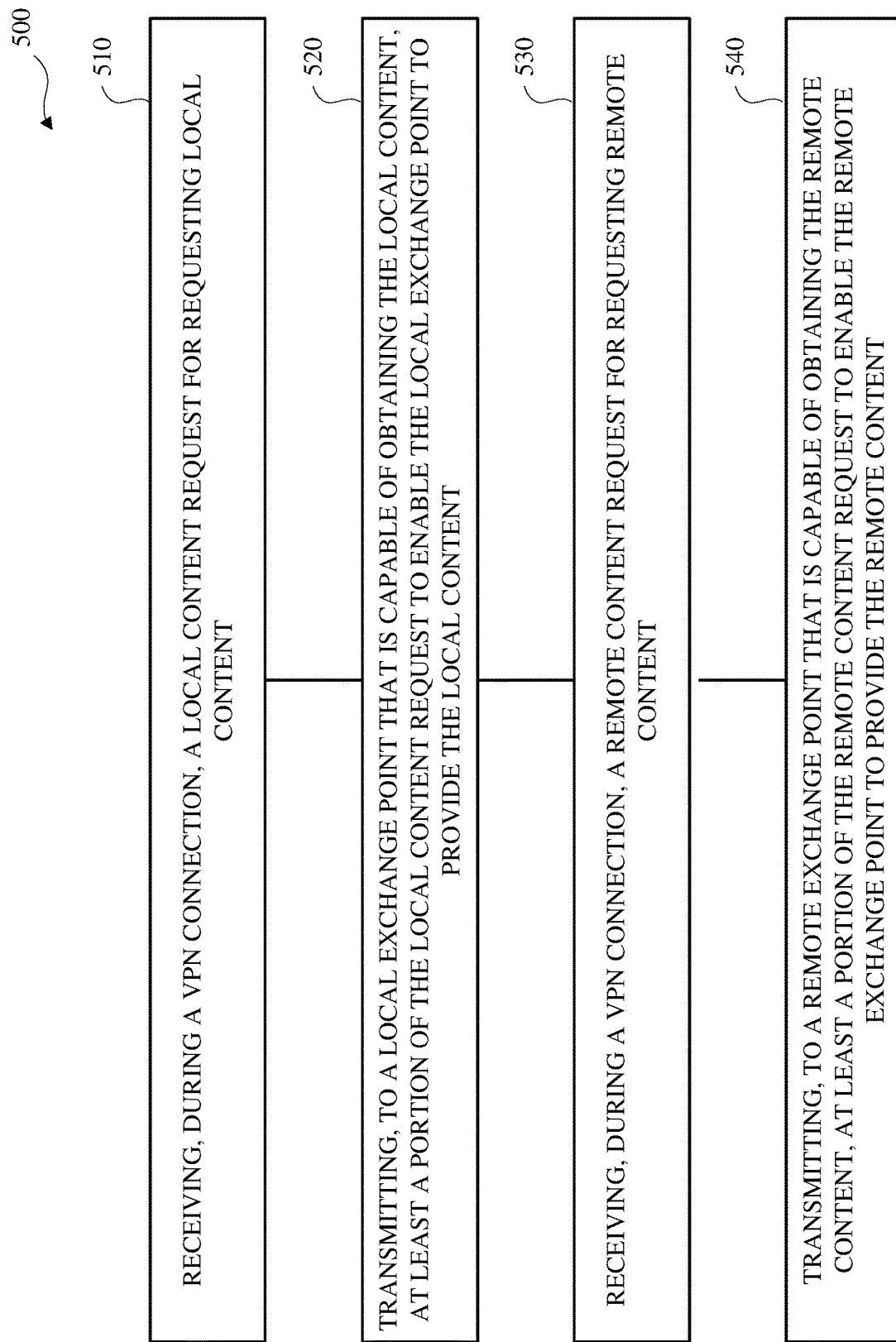
FIG. 5 is a flow diagram of an example process associated with providing a split-configuration virtual private network.

FIG. 5 is an illustration of an example process 500 associated with providing a split-configuration VPN, according to various aspects of the present disclosure. In some aspects, the process 500 may be performed by a memory (e.g., memory 730) and/or a processor (e.g., processor 720) associated with a VPN server (e.g., VPN server 120). As shown by reference numeral 510, process 500 may include receiving, during a VPN connection, a local content request requesting local content. For instance, the VPN server may utilize a communication interface (e.g., communication interface 770) and the associated memory and/or processor to receive, during a VPN connection, a local content request requesting local content, as discussed elsewhere herein.

As shown by reference numeral 520, process 500 may include transmitting, to a local exchange point that is capable of obtaining the local content, at least a portion of the local content request to enable the local exchange point to provide the local content. For instance, the VPN server may utilize the communication interface (e.g., communication interface 770) and the associated memory and/or processor to transmit, to a local exchange point that is capable of obtaining the local content, at least a portion of the local content request to enable the local exchange point to provide the local content, as discussed elsewhere herein.

As shown by reference numeral 530, process 500 may include receiving, during the VPN connection, a remote content request requesting remote content. For instance, the VPN server may utilize the communication interface (e.g., communication interface 770) and the associated memory and/or processor to receive, during the VPN connection, a remote content request requesting remote content, as discussed elsewhere herein.

As shown by reference numeral 540, process 500 may include receiving, during the VPN connection, a remote content request requesting remote content. For instance, the VPN server may utilize the communication interface (e.g., communication interface 770) and the associated memory and/or processor to transmit, to a remote exchange point that is capable of obtaining the remote content, at least a portion of the remote content request to enable the remote exchange point to provide the remote content, as discussed elsewhere herein.

Process 500 may include additional aspects, such as any single aspect or any combination of aspects described below and/or in connection with one or more other processes described elsewhere herein.

In a first aspect, in process 500, the local content request and the remote content request are received substantially simultaneously.

In a second aspect, alone or in combination with the first aspect, process 500 may include receiving, prior to establishment of the VPN connection, remote content information associated with the remote content.

In a third aspect, alone or in combination with the first through second aspects, process 500 may include selecting, based at least in part on remote content information received prior to establishment of the VPN connection, a domain name services (DNS) server to provide an access internet protocol (IP) address associated with the remote exchange point.

In a fourth aspect, alone or in combination with the first through third aspects, process 500 may include transmitting, to a remote domain name services (DNS) server, at least a portion of remote content information received prior to establishment of the VPN connection; and receiving, from the remote DNS server, an access internet protocol (IP) address associated with the remote exchange point, wherein transmitting at least the portion of the remote content request includes transmitting at least the portion of the remote content request using the IP address associated with the remote exchange point.

In a fifth aspect, alone or in combination with the first through fourth aspects, process 500 may include receiving, from the local exchange point, the local content based at least in part on transmitting at least the portion of the local content request to the local exchange point; and transmitting the local content to a user device.

In a sixth aspect, alone or in combination with the first through fifth aspects, process 500 may include receiving, during the VPN connection, a local content request for the local content; transmitting information associated with the local content request to a second exchange point; receiving the local content from the second exchange point; and transmitting the local content to the user device.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

Figure 6:
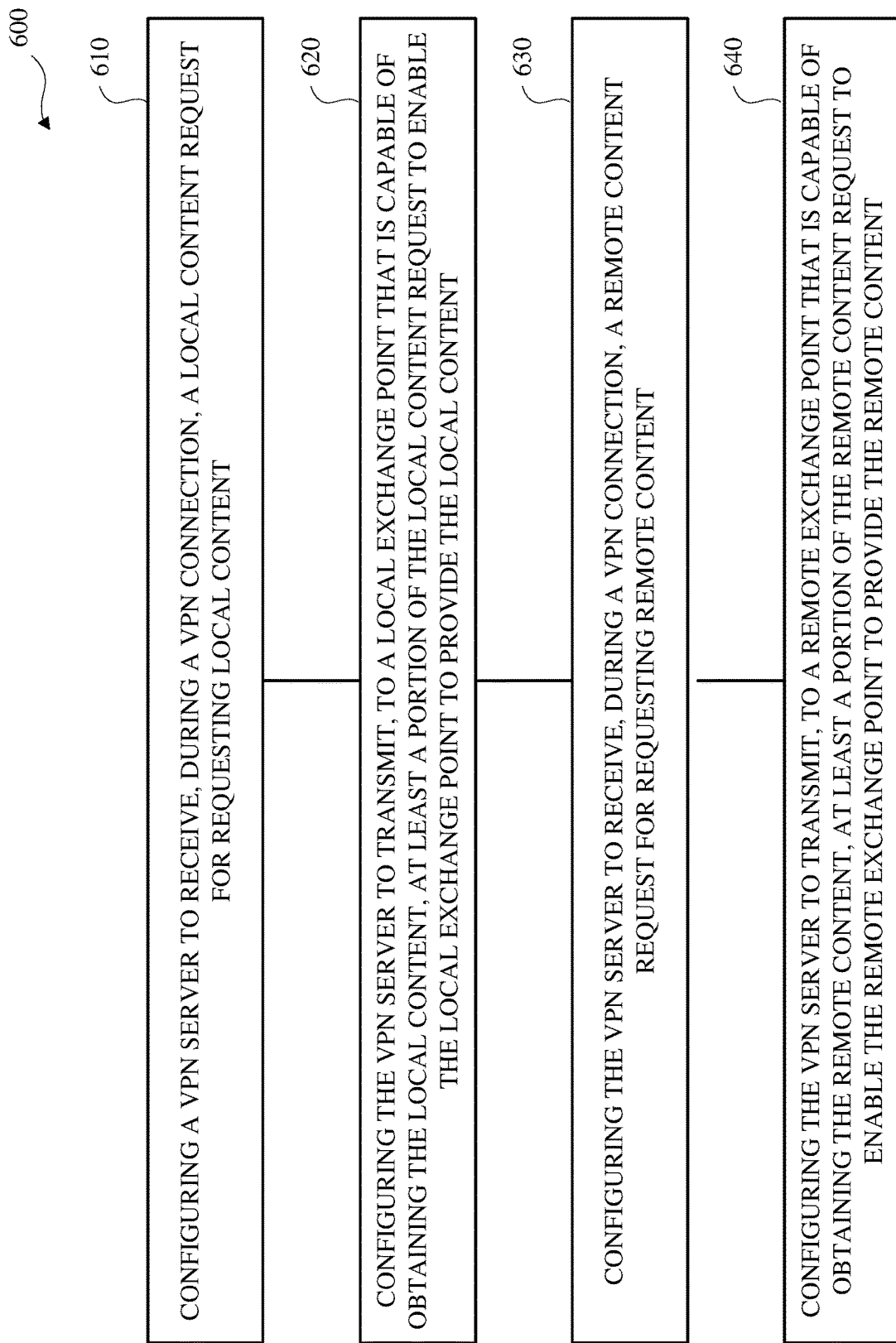
FIG. 6 is a flow diagram of an example process associated with providing a split-configuration virtual private network.

FIG. 6 is an illustration of an example process 600 associated with providing a split-configuration VPN, according to various aspects of the present disclosure. In some aspects, the process 600 may be performed by a memory (e.g., memory 730) and/or a processor (e.g., processor 720, processing unit 110, etc.) associated with a VSP control infrastructure (e.g., VSP control infrastructure 104). As shown by reference numeral 610, process 600 may include configuring a VPN server to receive, during a VPN connection, a local content request requesting local content. For instance, the VSP control infrastructure may utilize an associated memory and/or a processor to configure a VPN server to receive, during a VPN connection, a local content request requesting local content, as discussed elsewhere herein.

As shown by reference numeral 620, process 600 may include configuring the VPN server to transmit, to a local exchange point that is capable of obtaining the local content, at least a portion of the local content request to enable the local exchange point to provide the local content. For instance, the VPN server may utilize the associated memory and/or processor to configure the VPN server to transmit, to a local exchange point that is capable of obtaining the local content, at least a portion of the local content request to enable the local exchange point to provide the local content, as discussed elsewhere herein.

As shown by reference numeral 630, process 600 may include configuring the VPN server to receive, during the VPN connection, a remote content request requesting remote content. For instance, the VPN server may utilize the associated memory and/or processor to configure configuring the VPN server to receive, during the VPN connection, a remote content request requesting remote content, as discussed elsewhere herein.

As shown by reference numeral 640, process 600 may include configuring the VPN server to transmit, to a remote exchange point that is capable of obtaining the remote content, at least a portion of the remote content request to enable the remote exchange point to provide the remote content. For instance, the VPN server may utilize the associated memory and/or processor to configure the VPN server to transmit, to a remote exchange point that is capable of obtaining the remote content, at least a portion of the remote content request to enable the remote exchange point to provide the remote content, as discussed elsewhere herein.

Process 600 may include additional aspects, such as any single aspect or any combination of aspects described below and/or in connection with one or more other processes described elsewhere herein.

In a first aspect, process 600 includes configuring the VPN server to receive the local content request and the remote content request substantially simultaneously.

In a second aspect, alone or in combination with the first aspect, process 600 includes configuring the VPN server to receive, prior to establishment of the VPN connection, remote content information associated with the remote content.

In a third aspect, alone or in combination with the first through second aspects, process 600 includes configuring the VPN server to select, based at least in part on remote content information received prior to establishment of the VPN connection, a domain name services (DNS) server to provide an access internet protocol (IP) address associated with the remote exchange point.

In a fourth aspect, alone or in combination with the first through third aspects, process 600 includes configuring the VPN server to transmit, to a remote domain name services (DNS) server, at least a portion of remote content information received prior to establishment of the VPN connection; and configuring the VPN server to receive, from the remote DNS server, an access internet protocol (IP) address associated with the remote exchange point, wherein configuring the VPN server to transmit at least the portion of the remote content request includes configuring the VPN server to transmit at least the portion of the remote content request using the IP address associated with the remote exchange point.

In a fifth aspect, alone or in combination with the first through fourth aspects, process 600 includes configuring the VPN server to receive, from the remote exchange point, the remote content based at least in part on transmitting at least the portion of the remote content request to the remote exchange point; and configuring the VPN server to transmit the remote content to a user device.

In a sixth aspect, alone or in combination with the first through fifth aspects, process 600 includes configuring the VPN server to receive, from the local exchange point, the local content based at least in part on transmitting at least the portion of the local content request to the local exchange point; and configuring the VPN server to transmit the local content to a user device.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

Figure 7:
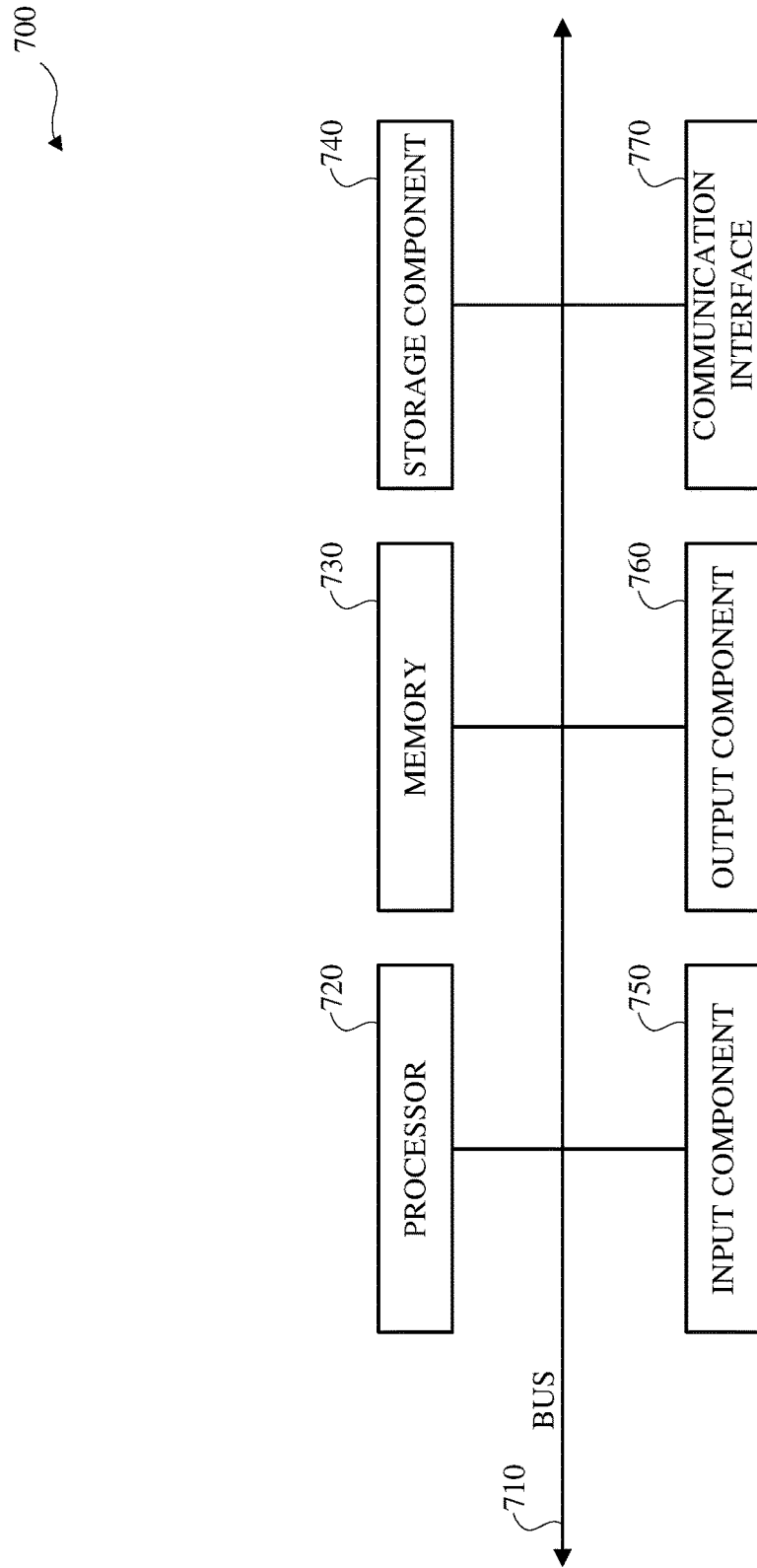
FIG. 7 is a block diagram of example devices associated with providing a split-configuration virtual private network.

FIG. 7 is an illustration of example devices 700, according to various aspects of the present disclosure. In some aspects, the example devices 700 may form part of or implement the systems, servers, environments, infrastructures, components, devices, or the like described elsewhere herein (e.g., VSP control infrastructure, VPN server, etc.). The example devices 700 may include a universal bus 710 communicatively coupling a processor 720, a memory 730, a storage component 740, an input component 750, an output component 760, and a communication interface 770.

Bus 710 may include a component that permits communication among multiple components of a device 700. Processor 720 may be implemented in hardware, firmware, and/or a combination of hardware and software. Processor 720 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 may include one or more processors capable of being programmed to perform a function. Memory 730 may include a random-access memory (RAM), a read only memory (ROM), and/or another type of dynamic or static storage device (e.g., a flash memory, a magnetic memory, and/or an optical memory) that stores information and/or instructions for use by processor 720.

Storage component 740 may store information and/or software related to the operation and use of a device 700. For example, storage component 740 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 750 may include a component that permits a device 700 to receive information, such as via user input (e.g., a touch screen display, a keyboard, a keypad, a mouse, a button, a switch, and/or a microphone). Additionally, or alternatively, input component 750 may include a component for determining location (e.g., a global positioning system (GPS) component) and/or a sensor (e.g., an accelerometer, a gyroscope, an actuator, another type of positional or environmental sensor, and/or the like). Output component 760 may include a component that provides output information from device 700 (via, for example, a display, a speaker, a haptic feedback component, an audio or visual indicator, and/or the like).

Communication interface 770 may include a transceiver-like component (e.g., a transceiver, a separate receiver, a separate transmitter, and/or the like) that enables a device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

A device 700 may perform one or more processes described elsewhere herein. A device 700 may perform these processes based on processor 720 executing software instructions stored by a non-transitory computer-readable medium, such as memory 730 and/or storage component 740. As used herein, the term "computer-readable medium" may refer to a non-transitory memory device. A memory device may include memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 7 are provided as an example. In practice, a device 700 may include additional components, fewer components, different components, or differently arranged components than those shown in FIG. 7. Additionally, or alternatively, a set of components (e.g., one or more components) of a device 700 may perform one or more functions described as being performed by another set of components of a device 700.

As indicated above, FIG. 7 is provided as an example. Other examples may differ from what is described with regard to FIG. 7.

Figure 8:
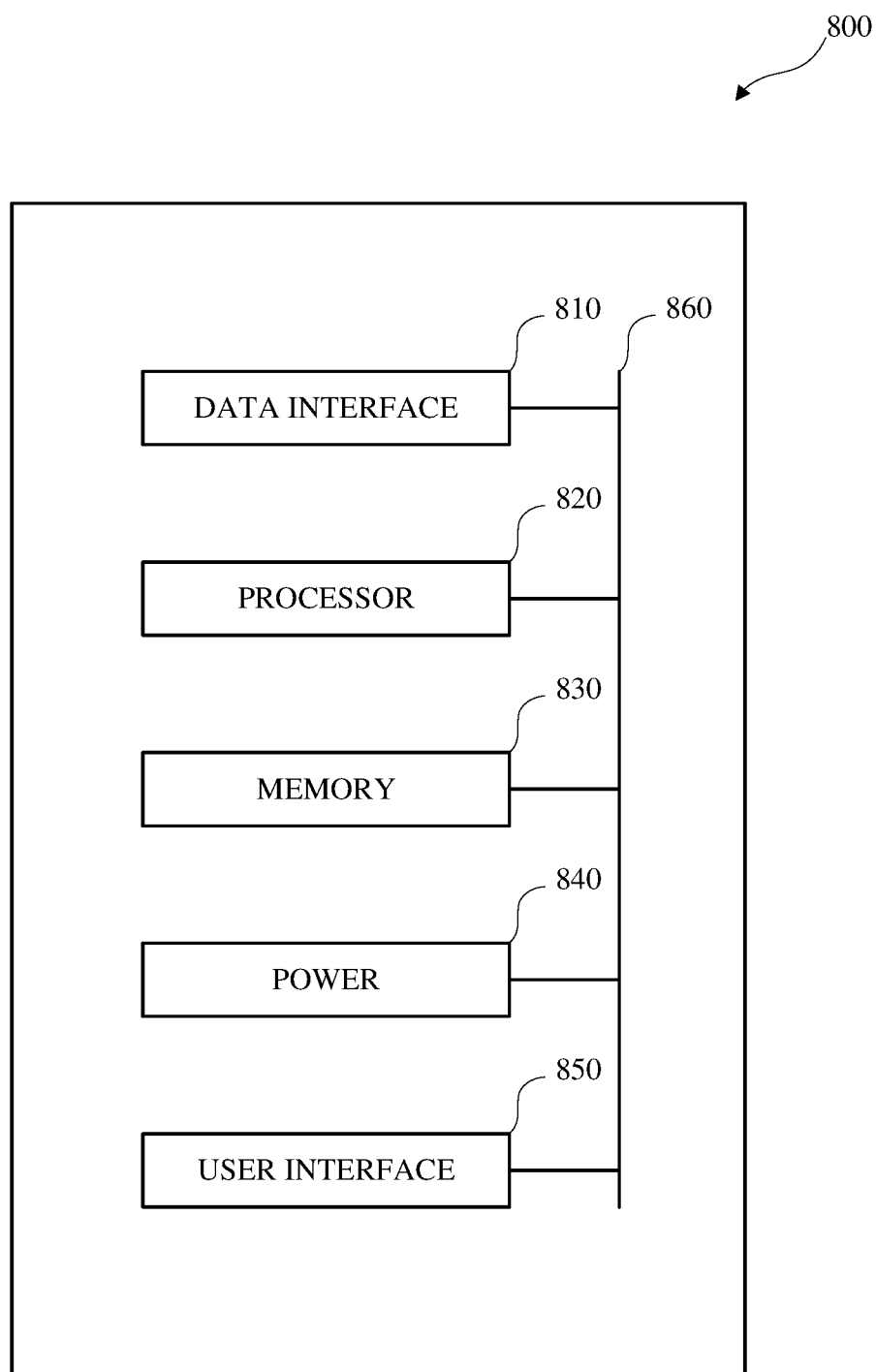
FIG. 8 is a block diagram of an example of a computing device.

FIG. 8 is a block diagram of an example of a computing device 800. The computing device 800 may implement, execute, or perform, one or more aspects of the methods and techniques described herein. The computing device 800 includes a data interface 810, a processor 820, memory 830, a power component 840, a user interface 850, and a bus 860 (collectively, components of the computing device 800). Although shown as a distinct unit, one or more of the components of the computing device 800 may be integrated into respective distinct physical units. For example, the processor 820 may be integrated in a first physical unit and the user interface 850 may be integrated in a second physical unit. The computing device 800 may include aspects or components not expressly shown in FIG. 8, such as an enclosure or one or more sensors. The computing device 800 may be similar to the devices 700 shown in FIG. 7, except as is described herein or as is otherwise clear from context.

In some implementations, the computing device 800 is a stationary device, such as a personal computer (PC), a server, a workstation, a minicomputer, or a mainframe computer. In some implementations, the computing device 800 is a mobile device, such as a mobile telephone, a personal digital assistant (PDA), a laptop, or a tablet computer.

The data interface 810 communicates, such as transmits, receives, or exchanges, data via one or more wired, or wireless, electronic communication mediums, such as a radio frequency (RF) communication medium, an ultraviolet (UV) communication medium, a visible light communication medium, a fiber optic communication medium, a wireline communication medium, or a combination thereof. For example, the data interface 810 may include, or may be, a transceiver. Although not shown separately in FIG. 8, the data interface 810 may include, or may be operatively coupled with, an antenna for wireless electronic communication. Although not shown separately in FIG. 8, the data interface 810 may include, or may be operatively coupled with, a wired electronic communication port, such as an Ethernet port, a serial port, or another wired port, that may interface with, or may be operatively coupled to, a wired electronic communication medium. In some implementations, the data interface 810 may be or may include a network interface card (NIC) or unit, a universal serial bus (USB), a Small Computer System Interface (SCSI), a Peripheral Component Interconnect (PCI), a near field communication (NFC) device, card, chip, or circuit, or another component for electronic data communication between the computing device 800, or one or more of the components thereof, and one or more external electronic or computing devices. Although shown as one unit in FIG. 8, the data interface 810 may include multiple physical components, such as a wired data interface and a wireless data interface.

For example, the computing device 800 may electronically communicate, such as transmit, receive, or exchange computer accessible data, with one or more other computing devices via one or more wired or wireless communication links, or connections, such as via a network, using the data interface 810, which may include using one or more electronic communication protocols, which may be network protocols, such as Ethernet, Transmission Control Protocol/Internet Protocol (TCP/IP), user datagram protocol (UDP), power line communication (PLC), infrared, ultra violet (UV), visible light, fiber optic, wire line, general packet radio service (GPRS), Global System for Mobile communications (GSM), code-division multiple access (CDMA), Long-Term Evolution (LTE), Universal Mobile Telecommunications System (UMTS), Institute of Electrical and Electronics Engineers (IEEE) standardized protocols, or other suitable protocols.

The processor 820 is a device, a combination of devices, or a system of connected devices, capable of manipulating or processing an electronic, computer accessible, signal, or other data, such as an optical processor, a quantum processor, a molecular processor, or a combination thereof.

In some implementations, the processor 820 is implemented as a central processing unit (CPU), such as a microprocessor. In some implementations, the processor 820 is implemented as one or more special purpose processors, one or more graphics processing units, one or more digital signal processors, one or more microprocessors, one or more controllers, one or more microcontrollers, one or more integrated circuits, one or more Application Specific Integrated Circuits, one or more Field Programmable Gate Arrays, one or more programmable logic arrays, one or more programmable logic controllers, firmware, one or more state machines, or a combination thereof.

The processor 820 includes one or more processing units. A processing unit may include one or more processing cores. The computing device 800 may include multiple physical or virtual processing units (collectively, the processor 820), which may be interconnected, such as via wired, or hardwired, connections, via wireless connections, or via a combination of wired and wireless connections. In some implementations, the processor 820 is implemented in a distributed configuration including multiple physical devices or units that may be coupled directly or across a network. The processor 820 includes internal memory (not expressly shown), such as a cache, a buffer, a register, or a combination thereof, for internal storage of data, such as operative data, instructions, or both. For example, the processor 820 may read data from the memory 830 into the internal memory (not shown) for processing.

The memory 830 is a non-transitory computer-usable or computer-readable medium, implemented as a tangible device or component of a device. The memory 830 contains, stores, communicates, transports, or a combination thereof, data, such as operative data, instructions, or both. For example, the memory 830 stores an operating system of the computing device 800, or a portion thereof. The memory 830 contains, stores, communicates, transports, or a combination thereof, data, such as operative data, instructions, or both associated with implementing, or performing, the methods and techniques, or portions or aspects thereof, described herein. For example, the non-transitory computer-usable or computer-readable medium may be implemented as a solid-state drive, a memory card, removable media, a read-only memory (ROM), a random-access memory (RAM), any type of disk including a hard disk, a floppy disk, an optical disk, a magnetic or optical card, an application-specific integrated circuits (ASICs), or another type of non-transitory media suitable for storing electronic data, or a combination thereof. The memory 830 may include non-volatile memory, such as a disk drive, or another form of non-volatile memory capable of persistent electronic data storage, such as in the absence of an active power supply. The memory 830 may include, or may be implemented as, one or more physical or logical units.

The memory 830 stores executable instructions or data, such as application data, an operating system, or a combination thereof, for access, such as read access, write access, or both, by the other components of the computing device 800, such as by the processor 820. The executable instructions may be organized as program modules or algorithms, functional programs, codes, code segments, or combinations thereof to perform one or more aspects, features, or elements of the methods and techniques described herein. The application data may include, for example, user files, database catalogs, configuration information, or a combination thereof. The operating system may be, for example, a desktop or laptop operating system; an operating system for a mobile device, such as a smartphone or tablet device; or an operating system for a large device, such as a mainframe computer. For example, the memory 830 may be implemented as, or may include, one or more dynamic random-access memory (DRAM) modules, such as a Double Data Rate Synchronous Dynamic Random-Access Memory module, Phase-Change Memory (PCM), flash memory, or a solid-state drive.

The power component 840 obtains, stores, or both, power, or energy, used by the components of the computing device 800 to operate. The power component 840 may be implemented as a general-purpose alternating-current (AC) electric power supply, or as a power supply interface, such as an interface to a household power source or other external power distribution system. In some implementations, the power component 840 may be implemented as a single use battery or a rechargeable battery such that the computing device 800 operates, or partially operates, independently of an external power distribution system. For example, the power component 840 may include a wired power source; one or more dry cell batteries, such as nickel-cadmium (NiCad), nickel-zinc (NiZn), nickel metal hydride (NiMH), lithium-ion (Li-ion); solar cells; fuel cells; or any other device, or combination of devices, capable of powering the computing device 800.

The user interface 850 includes one or more units or devices for interfacing with an operator of the computing device 800, such as a human user. In some implementations, the user interface 850 obtains, receives, captures, detects, or otherwise accesses, data representing user input to the computing device, such as via physical interaction with the computing device 800. In some implementations, the user interface 850 outputs, presents, displays, or otherwise makes available, information, such as to an operator of the computing device 800, such as a human user.

The user interface 850 may be implemented as, or may include, a virtual or physical keypad, a touchpad, a display, such as a liquid crystal display (LCD), a cathode-ray tube (CRT), a light emitting diode (LED) display, an organic light emitting diode (OLED) display, an active-matrix organic light emitting diode (AMOLED), a touch display, a speaker, a microphone, a video camera, a sensor, a printer, or any combination thereof. In some implementations, a physical user interface 850 may be omitted, or absent, from the computing device 800.

The bus 860 distributes or transports data, power, or both among the components of the computing device 800 such that the components of the computing device are operatively connected. Although the bus 860 is shown as one component in FIG. 8, the computing device 800 may include multiple busses, which may be connected, such as via bridges, controllers, or adapters. For example, the bus 860 may be implemented as, or may include, a data bus and a power bus. The execution, or performance, of instructions, programs, code, applications, or the like, so as to perform the methods and techniques described herein, or aspects or portions thereof, may include controlling, such as by sending electronic signals to, receiving electronic signals from, or both, the other components of the computing device 800.

Although not shown separately in FIG. 8, data interface 810, the power component 840, or the user interface 850 may include internal memory, such as an internal buffer or register.

Although an example of a configuration of the computing device 800 is shown in FIG. 8, other configurations may be used. One or more of the components of the computing device 800 shown in FIG. 8 may be omitted, or absent, from the computing device 800 or may be combined or integrated. For example, the memory 830, or a portion thereof, and the processor 820 may be combined, such as by using a system on a chip design.

Figure 9:
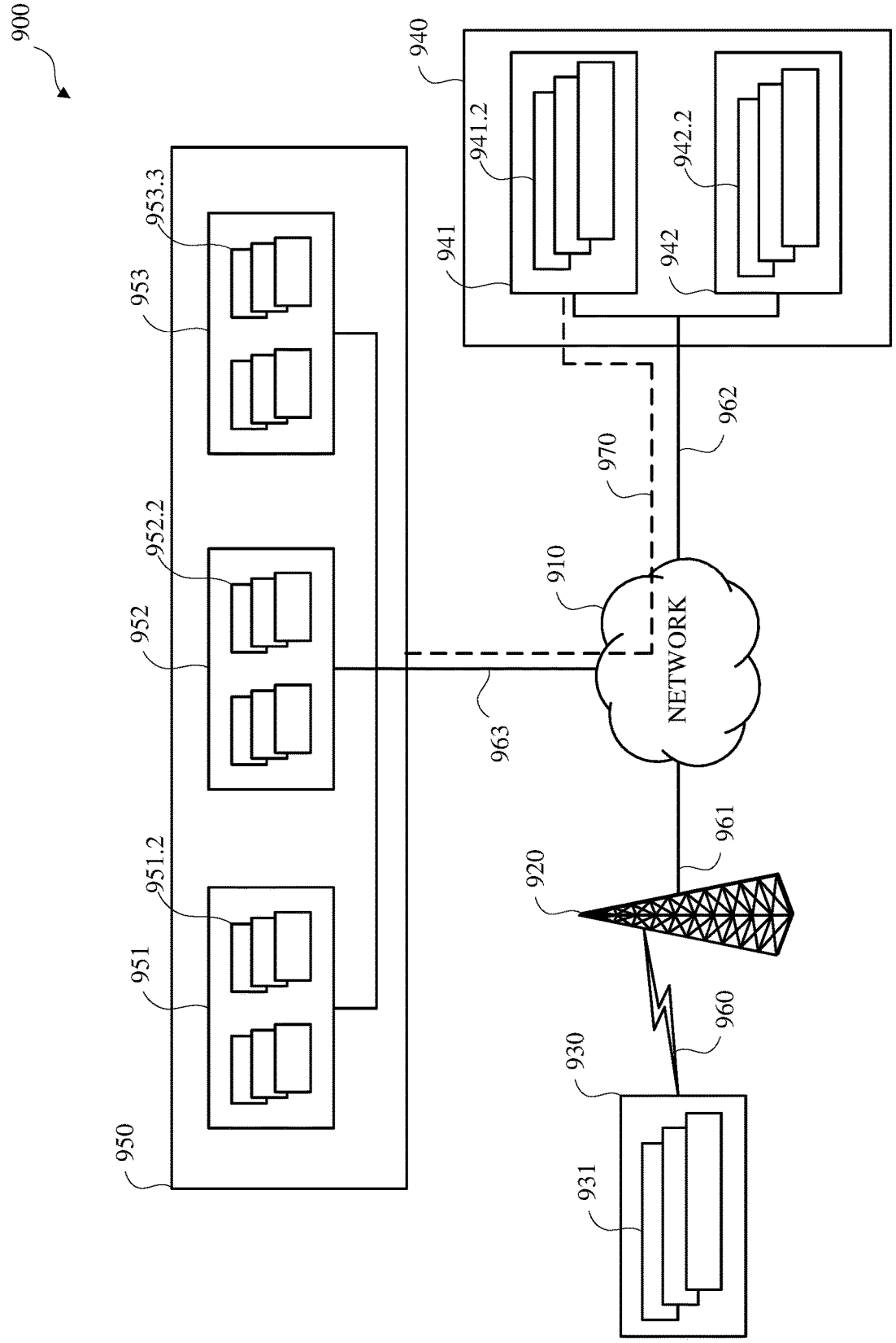
FIG. 9 is a block diagram of an example of a computing and communications system.

FIG. 9 is a diagram of a computing and communications system 900. The computing and communications system 900 includes a first network 910, an access point 920, a first computing and communications device 930, a second network 940, and a third network 950. The second network 940 includes a second computing and communications device 941 and a third computing and communications device 942. The third network 950 includes a fourth computing and communications device 951, a fifth computing and communications device 952, and a sixth computing and communications device 953. Other configurations, including fewer or more computing and communications devices, fewer or more networks, and fewer or more access points, may be used. The computing and communications system 900 may be similar to the system 100 shown in FIG. 1 or the system 200 shown in FIG. 2, except as is described herein or as is otherwise clear from context.

One or more of the networks 910, 940, 950 may be, or may include, a local area network (LAN), wide area network (WAN), virtual private network (VPN), a mobile or cellular telephone network, the Internet, or any other means of electronic communication. The networks 910, 940, 950 respectively transmit, receive, convey, carry, or exchange wired or wireless electronic communications using one or more communications protocols, or combinations of communications protocols, the transmission control protocol (TCP), the user datagram protocol (UDP), the internet protocol (IP), the real-time transport protocol (RTP), the HyperText Transport Protocol (HTTP), or a combination thereof. For example, a respective network 910, 940, 950, or respective portions thereof, may be, or may include a circuit-switched network, or a packet-switched network wherein the protocol is a packet-based protocol. A packet is a data structure, such as a data structure that includes a header, which may contain control data or 'meta' data describing the packet, and a body, or payload, which may contain the substantive data conveyed by the packet.

The access point 920 may be implemented as, or may include, a base station, a base transceiver station (BTS), a Node-B, an enhanced Node-B (eNode-B), a Home Node-B (HNode-B), a wireless router, a wired router, a hub, a relay, a switch, a bridge, or any similar wired or wireless device. Although the access point 920 is shown as a single unit, an access point can include any number of interconnected elements. Although one access point 920 is shown, fewer or more access points may be used. The access point 920 may communicate with other communicating devices via wired or wireless electronic communications links or via a sequence of such links.

As shown, the access point 920 communicates via a first communications link 960 with the first computing and communications device 930. Although the first communications link 960 is shown as wireless, the first communications link 960 may be implemented as, or may include, one or more wired or wireless electronic communications links or a sequence of such links, which may include parallel communications links for multipath communications.

As shown, the access point 920 communicates via a second communications link 961 with the first network 910. Although the second communications link 961 is shown as wired, the second communications link 961 may be implemented as, or may include, one or more wired or wireless electronic communications links or a sequence of such links, which may include parallel communications links for multipath communications.

As shown, the first network 910 communicates with the second network 940 via a third communications link 962. Although the third communications link 962 is shown as wired, the third communications link 962 may be implemented as, or may include, one or more wired or wireless electronic communications links or a sequence of such links, which may include parallel communications links for multipath communications.

As shown, the first network 910 communicates with the third network 950 via a fourth communications link 963. Although the fourth communications link 963 is shown as wired, the fourth communications link 963 may be implemented as, or may include, one or more wired or wireless electronic communications links or a sequence of such links, which may include parallel communications links for multipath communications.

The computing and communications devices 930, 941, 942, 951, 952, 953 are, respectively, computing devices, such as the computing device 800 shown in FIG. 8. For example, the first computing and communications device 930 may be a user device, such as a mobile computing device or a smartphone, the second computing and communications device 941 may be a user device, such as a laptop, the third computing and communications device 942 may be a user device, such as a desktop, the fourth computing and communications device 951 may be a server, such as a database server, the fifth computing and communications device 953 may be a server, such as a cluster or a mainframe, and the sixth computing and communications device 953 may be a server, such as a web server.

The computing and communications devices 930, 941, 942, 951, 952, 953 communicate, or exchange data, such as voice communications, audio communications, data communications, video communications, messaging communications, broadcast communications, or a combination thereof, with one or more of the other computing and communications devices 930, 941, 942, 951, 952, 953 respectively using one or more of the networks 910, 940, 950, which may include communicating using the access point 920, via one or more of the communication links 960, 961, 962, 963.

For example, the first computing and communications device 930 may communicate with the second computing and communications device 941, the third computing and communications device 942, or both, via the first communications link 960, the access point 920, the second communications link 961, the network 910, the third communications link 962, and the second network 940. The first computing and communications device 930 may communicate with one or more of the third computing and communications device 951, the fourth computing and communications device 952, the fifth computing and communications device 953, via the first communications link 960, the access point 920, the second communications link 961, the network 910, the fourth communications link 963, and the third network 950.

For simplicity and clarity, the sequence of communications links, access points, networks, and other communications devices between a sending communicating device and a receiving communicating device may be referred to herein as a communications path. For example, the first computing and communications device 930 may send data to the second computing and communications device 941 via a first communications path, or via a combination of communications paths including the first communications path, and the second computing and communications device 941 may send data to the first computing and communications device 930 via the first communications path, via a second communications path, or via a combination of communications paths, which may include the first communications path.

The first computing and communications device 930 includes, such as executes, performs, or operates, one or more applications, or services, 931. The second computing and communications device 941 includes, such as executes, performs, or operates, one or more applications, or services, 941.2. The third computing and communications device 942 includes, such as executes, performs, or operates, one or more applications, or services, 942.2. The fourth computing and communications device 951 includes, such as stores, hosts, executes, performs, or operates, one or more documents, applications, or services, 951.2. The fifth computing and communications device 952 includes, such as stores, hosts, executes, performs, or operates, one or more documents, applications, or services, 952.2. The sixth computing and communications device 953 includes, such as stores, hosts, executes, performs, or operates, one or more documents, applications, or services, 953.2.

In some implementations, one or more of the computing and communications devices 930, 941, 942, 951, 952, 953 may communicate with one or more other computing and communications devices 930, 941, 942, 951, 952, 953, or with one or more of the networks 940, 950, via a virtual private network. For example, the second computing and communications device 941 is shown as communicating with the third network 950, and therefore with one or more of the computing and communications devices 951, 952, 953 in the third network 950, via a virtual private network 970, which is shown using a broken line to indicate that the virtual private network 970 uses the first network 910, the third communications link 962, and the third communications link 963.

In some implementations, two or more of the computing and communications devices 930, 941, 942, 951, 952, 953 may be in a distributed, or clustered, configuration. For example, the third computing and communications device 951, the fourth computing and communications device 952, and the fifth computing and communications device 953 may, respectively, be elements, or nodes, in a distributed configuration.

In some implementations, one or more of the computing and communications devices 930, 941, 942, 951, 952, 953 may be a virtual device. For example, the third computing and communications device 951, the fourth computing and communications device 952, and the fifth computing and communications device 953 may, respectively, be virtual devices operating on shared physical resources.

Figure 10:
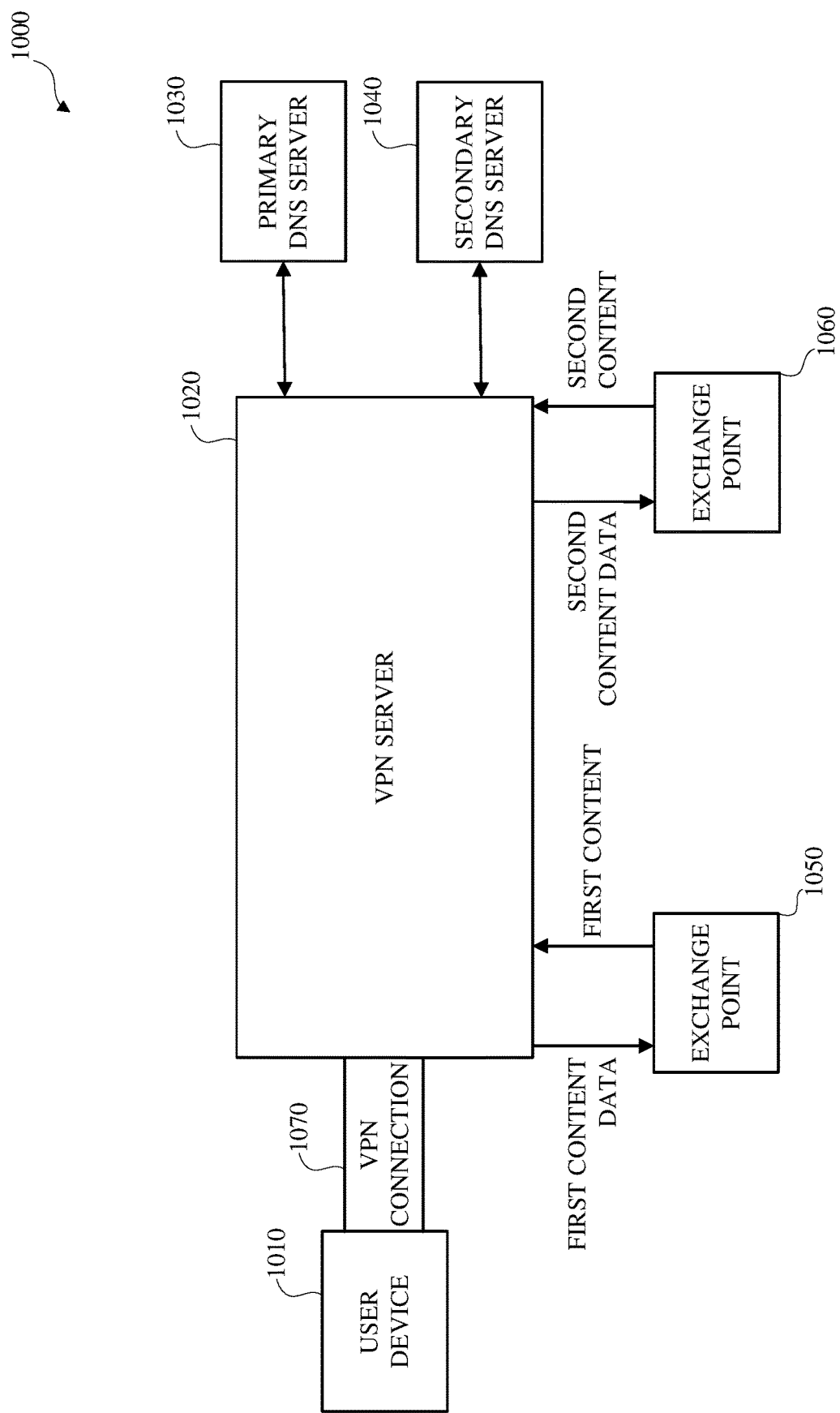
FIG. 10 is a block diagram of another example of a computing and communications system for domain name system configuration during virtual private network connection.

FIG. 10 is a block diagram of another example of a computing and communications system 1000 for domain name system configuration during virtual private network connection. The computing and communications system 1000 shown in FIG. 10 is similar to the computing and communications system 900 shown in FIG. 9, the system shown in FIG. 1, the system 200 shown in FIG. 2, except as is described herein or as is otherwise clear from context.

The computing and communications system 1000 for domain name system configuration during virtual private network connection shown in FIG. 10 includes a user device 1010, a virtual private network server 1020, a primary domain name system server 1030, a secondary domain name system server 1040, a first exchange point 1050, and a second exchange point 1060.

The user device 1010 may be one or more computing devices, such as one or more of the computing device 800 shown in FIG. 8, one or more of the computing and communications device 930, 941, 942, 951, 952, 953 shown in FIG. 9, the user device 102 shown in FIG. 1, the user device 102 shown in FIG. 3, or the device 700 shown in FIG. 7, except as is described herein or as is otherwise clear from context. The user device 1010 may be similar to the user device 102 shown in FIG. 2, except as is described herein or as is otherwise clear from context.

The virtual private network server 1020 may be one or more computing devices, such as one or more of the computing device 800 shown in FIG. 8, one or more of the computing and communications device 930, 941, 942, 951, 952, 953 shown in FIG. 9, the virtual private network service provider control infrastructure 104 shown in FIG. 1, one or more components 106, 108, 110, 116, 120, of the virtual private network service provider control infrastructure 104 shown in FIG. 1, the virtual private network server 120 shown in FIG. 2, or the device 700 shown in FIG. 7, except as is described herein or as is otherwise clear from context. The virtual private network server 1020 may be, or may include, a virtual private network entry server. The virtual private network server 1020 may be similar to the virtual private network server 120 shown in FIG. 3, except as is described herein or as is otherwise clear from context.

The primary domain name system server 1030 may be one or more computing devices, such as one or more of the computing device 800 shown in FIG. 8, one or more of the computing and communications device 930, 941, 942, 951, 952, 953 shown in FIG. 9, or the device 700 shown in FIG. 7, except as is described herein or as is otherwise clear from context. The primary domain name system server 1030 may be similar to the default domain name system server 210 or the remote domain name system server 220 shown in FIG. 2, except as is described herein or as is otherwise clear from context.

The secondary domain name system server 1040 may be one or more computing devices, such as one or more of the computing device 800 shown in FIG. 8, one or more of the computing and communications device 930, 941, 942, 951, 952, 953 shown in FIG. 9, or the device 700 shown in FIG. 7, except as is described herein or as is otherwise clear from context. The secondary domain name system server 1040 may be similar to the default domain name system server 210 or the remote domain name system server 220 shown in FIG. 2, except as is described herein or as is otherwise clear from context.

The first exchange point 1050 may be one or more computing devices, such as one or more of the computing device 800 shown in FIG. 8, one or more of the computing and communications device 930, 941, 942, 951, 952, 953 shown in FIG. 9, or the device 700 shown in FIG. 7, except as is described herein or as is otherwise clear from context.

The first exchange point 1050 may be similar to one or more of the virtual private network servers 120 shown in FIG. 1, or one or more of the exchange points 230, 240 shown in FIG., except as is described herein or as is otherwise clear from context.

The second exchange point 1060 may be one or more computing devices, such as one or more of the computing device 800 shown in FIG. 8, one or more of the computing and communications device 930, 941, 942, 951, 952, 953 shown in FIG. 9, or the device 700 shown in FIG. 7, except as is described herein or as is otherwise clear from context. The second exchange point 1060 may be similar to one or more of the virtual private network servers 120 shown in FIG. 1, or one or more of the exchange points 230, 240 shown in FIG., except as is described herein or as is otherwise clear from context.

The user device 1010 may establish, initiate, or obtain, and use, or communicate, such as send, receive, or both, data, such as protocol data units, via, a virtual private network tunnel 1070 (VPN connection) to exchange electronic communications with the virtual private network server 1020, one or more of the exchange points 1050, 1060, one or more of the domain name system servers 1030, 1040, or one or more external devices or system (not shown). The virtual private network tunnel 1070 may be similar to the VPN connection shown in FIG. 2, except as is described herein or as is otherwise clear from context.

The exchange points 1050, 1060 may be respective virtual private network exit nodes, such that data transmitted by the user device 1010, via the tunnel 1070, may be received by the virtual private network server 1020, or a virtual private network entry server thereof, the virtual private network server 1020, or the virtual private network entry server thereof, may transmit the data to one of the exchange points 1050, 1060, the respective exchange point 1050, 1060, may receive the data, and the respective exchange point 1050, 1060, may transmit the data to an external server, system, or network, which may be a public network.

The user device 1010, the virtual private network server 1020, or a combination of the user device 1010 and the virtual private network server 1020 may use one or more of the domain name system servers 1030, 1040 to obtain an internet protocol address, or other electronic communication routing or delivery information.

The user device 1010, the virtual private network server 1020, or a combination of the user device 1010 and the virtual private network server 1020 may use one or more of the exchange points 1050, 1060 to obtain data, such as content, from the external device or system (not shown). An example of establishing the virtual private network tunnel 1070 and using the virtual private network tunnel 1070 to obtain data from the external server or system is shown in FIGS. 11 and 12.

Figure 11:
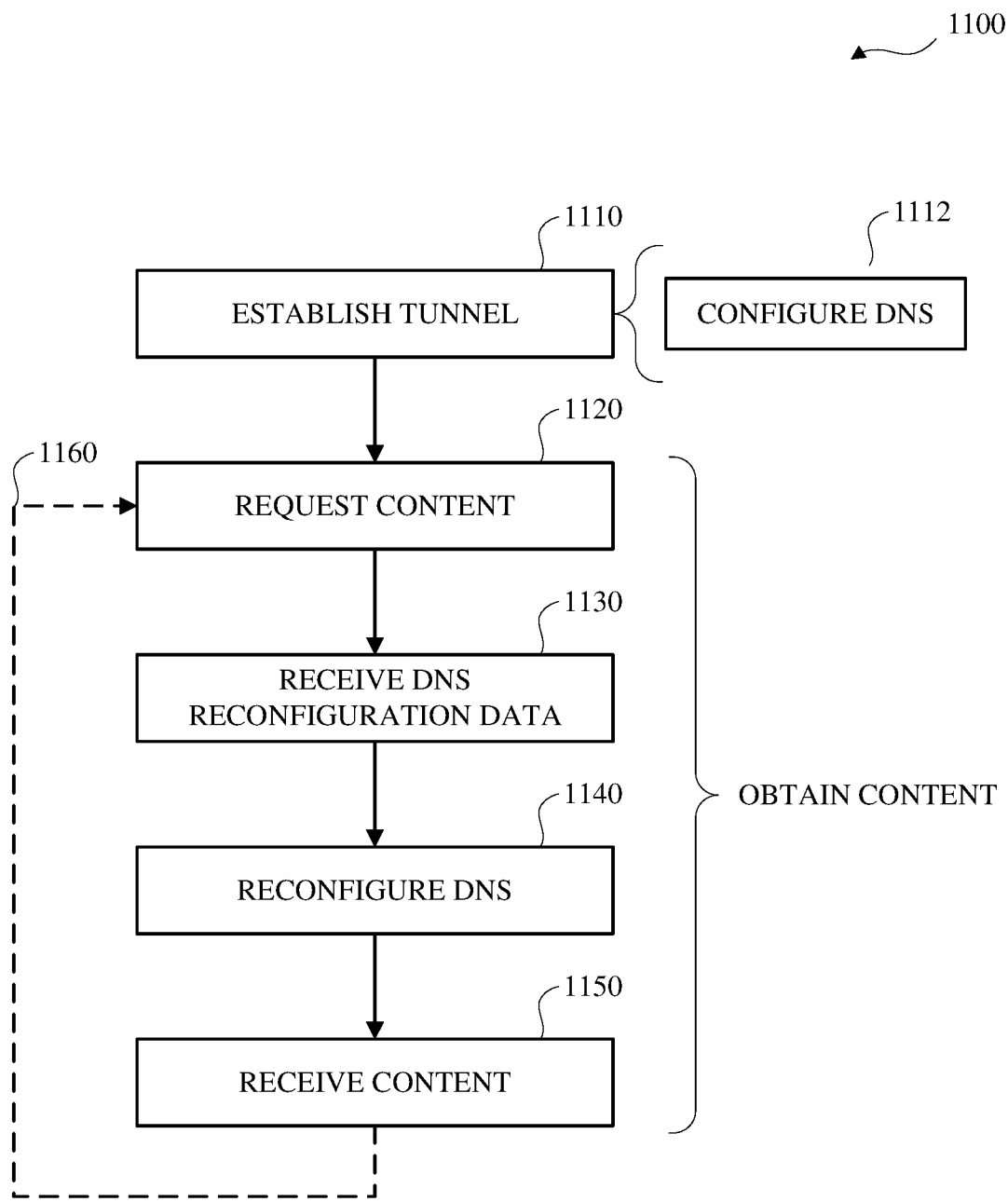
FIG. 11 is a flowchart of an example of domain name system configuration during virtual private network connection.
Figure 12:
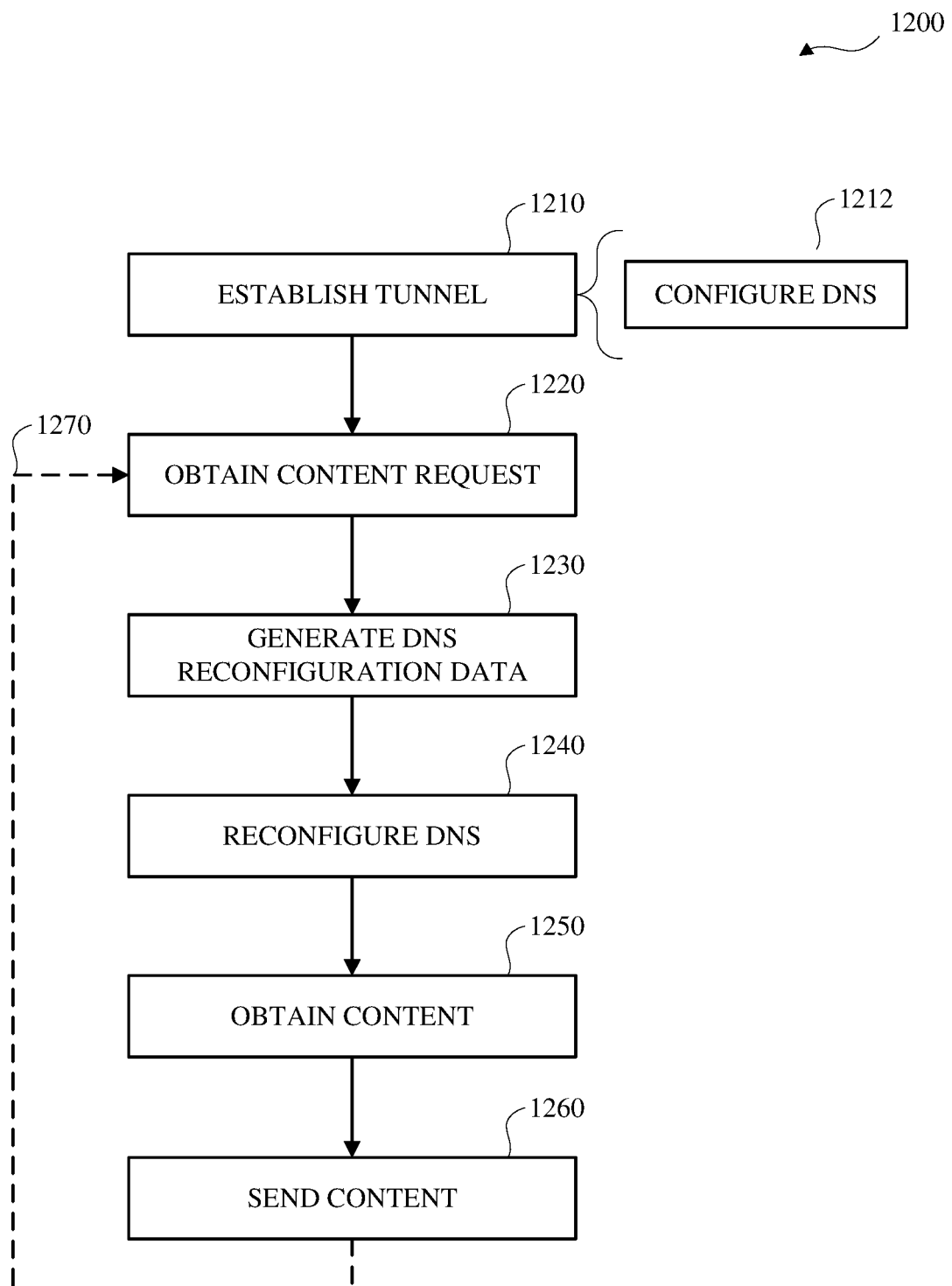
FIG. 12 is a flowchart of an example of domain name system configuration during virtual private network connection for a virtual private network service provider infrastructure system.

FIG. 11 is a flowchart of an example of domain name system configuration during virtual private network connection 1100. Domain name system configuration during virtual private network connection 1100, or one or more portions thereof, may be implemented by one or more computing devices, such as one or more of the computing device 800 shown in FIG. 8, one or more of the computing and communications device 930, 941, 942, 951, 952, 953 shown in FIG. 9, the user device 102 shown in FIG. 1, the user device 102 shown in FIG. 2, the user device 102 shown in FIG. 3, or the device 700 shown in FIG. 7, or by a system, such as the network 950 shown in FIG. 9, including one or more computing devices.

Domain name system configuration during virtual private network connection 1100 includes establishing a virtual private network tunnel 1110, requesting content 1120, receiving domain name system reconfiguration data 1130, reconfiguring domain name system configuration 1140, and receiving content 1150.

A client device, such as the user device 1010 shown in FIG. 10, may initiate, establish, or obtain the virtual private network tunnel 1110 between the client device and a virtual private network service provider infrastructure device, such as a virtual private network entry server, such as the virtual private network server 1020 shown in FIG. 10.

Obtaining, initiating, or establishing, a virtual private network tunnel 1110 may include authentication (not shown), such as in response to obtaining user input data at the client device indicating a request to authenticate with the virtual private network service provider infrastructure system. The authentication may be similar to the authentication described with respect to FIG. 2, except as is described herein or as is otherwise clear from context. For example, a client device, such as the user device 1010 shown in FIG. 10, or a component thereof, such as virtual private network component, may send, transmit, or otherwise make available, authentication data, such as credentials, for authenticating the user device to a component, such as an authentication server, of a virtual private network service provider control infrastructure, such as the virtual private network service provider control infrastructure 104 shown in FIG. 1. In some implementations, authentication may include the client device obtaining an IP address for the component of the virtual private network service provider control infrastructure, from a domain name system server, such as a local domain name system server, such as a domain name system server associated with, or operated by, an Internet service provider that provides Internet service to the client device, wherein the client device is configured to use the local domain name system server for domain name resolution. The virtual private network service provider control infrastructure component may authenticate, or validate, the authentication data and may identify the client device, or the virtual private network component thereof, as authenticated.

Although not shown separately in FIG. 11, establishing the virtual private network tunnel 1110 may include the client device obtaining, receiving, or otherwise accessing, available virtual private network server data, such as data identifying, such as by domain name, URL, IP address, or a combination thereof, virtual private network servers available for establishing and operating a virtual private network tunnel between the client device and the virtual private network service provider infrastructure, or network. The virtual private network server availability data may include one or more IP addresses for one or more entry virtual private network servers available for establishing and operating a virtual private network tunnel between the client device and the virtual private network service provider infrastructure, or network.

Establishing the virtual private network tunnel 1110 may include the user device identifying a virtual private network entry server for the virtual private network tunnel. For example, the virtual private network entry server may be identified in response to obtaining input data, such as in response to input, such as user input, obtained at the client device, selecting, or otherwise indicating, the virtual private network entry server. The input data identifying the virtual private network entry server may include attribute data defining or describing one or more attributes for establishing, or using, the virtual private network tunnel. For example, the attribute data may include attribute data defining or describing an attribute indicating a location of the entry virtual private network server relative to the location (geographic location) of the client device. In another example, the attribute data may include attribute data defining or describing an attribute indicating a virtual private network protocol compatible with the entry virtual private network server. In another example, the attribute data may include attribute data defining or describing an attribute indicating the peak, or highest, available bandwidth of the entry virtual private network server. In another example, the attribute data may include attribute data defining or describing an attribute indicating a location (geographic location) of the entry virtual private network server relative to an international Internet exchange hub. In another example, the attribute data may include attribute data defining or describing an attribute indicating one or more virtual private network service features, such as ad blocking or malware blocking, available via the entry virtual private network server.

Although not shown separately in FIG. 11, establishing the virtual private network tunnel 1110 may include the client device obtaining, receiving, or otherwise accessing, the virtual private network entry server data, or a portion thereof, from a component of the virtual private network service provider infrastructure system, such as from the application programming interface 106, 110 shown in FIG. 1. The virtual private network entry server may be an optimal available virtual private network entry server identified based on the location (geographic location) of the client device.

The client device establishes, initiates, instantiates, or obtains, the virtual private network tunnel with the virtual private network entry server. Establishing the virtual private network tunnel 1110 may include sending, transmitting, or otherwise making available, data, such as one or more protocol data units, indicating a request to establish the virtual private network tunnel between the client device and the virtual private network entry server. In some implementations, the client device may include the attribute data, or a portion thereof, in the request to establish the virtual private network tunnel.

The client device configures one or more domain name system servers to use for the virtual private network tunnel 1112, which includes configuring a domain name system server as an operative domain name system server for the virtual private network tunnel. For example, the client device may configure a primary domain name system server, such as the primary domain name system server 1030 shown in FIG. 10, a secondary domain name system server, such as the secondary domain name system server 1040 shown in FIG. 10, or both for use with the virtual private network tunnel. The configured domain name system servers are domain name system servers accessible by the virtual private network entry server.

The client device may include data identifying, such as by domain name or by IP address, one or more domain name system servers, such as a primary domain name system server, such as the primary domain name system server 1030 shown in FIG. 10, a secondary domain name system server, such as the secondary domain name system server 1040 shown in FIG. 10, or both, in the request to establish the virtual private network tunnel.

The primary domain name system server may have, such as store, a defined list, or other data structure, of available virtual private network exit servers, one or more respective defined lists, or other data structures, of external devices, systems, or domains accessible via the respective virtual private network exit servers available, or accessible, via the primary domain name system server. The secondary domain name system server may have, such as store, a defined list, or other data structure, of available virtual private network exit servers, one or more respective defined lists, or other data structures, of external devices, systems, or domains accessible via the respective virtual private network exit servers available, or accessible, via the secondary domain name system server.

The virtual private network exit servers available, or accessible, via the primary domain name system server may differ, or partially differ, from the virtual private network exit servers available, or accessible, via the secondary domain name system server. The external devices, systems, or domains available, or accessible, via the primary domain name system server may differ, or partially differ, from the external devices, systems, or domains available, or accessible, via the secondary domain name system server. For example, the primary domain name system server may be located (geographic location) relatively near the client device, which may be in a geofenced location such that devices, systems, or IP addresses located in some areas (geographic areas) may be unavailable or inaccessible to the primary domain name system server. In some implementations, one or more of the devices, systems, or IP addresses unavailable or inaccessible to the primary domain name system server may be available or accessible to the secondary domain name system server.

The client device sends, transmits, or otherwise makes available, a request for content 1120, such as by sending the request as one or more protocol data units, to the virtual private network entry server. The request for content identifies an external device, such as an external server, system, or domain, as a source for the content. For example, the client device may send a request for content hosted by an external device or system.

The virtual private network entry server receives, or otherwise accesses, the request for content. The virtual private network service provider control infrastructure determines whether the requested content is available, or accessible, from an external device, or server, accessible or available via the operative domain name system server for the virtual private network tunnel, such as the primary domain name system server.

In some implementations, the requested content, or feature, may be accessible or available from an external device that is accessible or available via the operative domain name system server for the virtual private network tunnel and reconfiguring the operative domain name system server 1140 may be omitted.

In some implementations, the requested content, or feature, may be inaccessible or unavailable from an external device that is accessible or available via the operative domain name system server for the virtual private network tunnel, indicating that a virtual private network system exit server for obtaining the content is unavailable using the operative domain name system server, and the virtual private network entry server may send, transmit, or otherwise make available, to the client device, one or more protocol data units, including a domain name system reconfiguration message, wherein the domain name system reconfiguration message indicates a another domain name system server, wherein a virtual private network system exit server for obtaining the content is available using the other domain name system server.

Responsive to transmitting the request for content, and on the condition that the virtual private network entry server responds to the request for content by sending the domain name system reconfiguration message, the client device receives, obtains, or otherwise accesses, the domain name system reconfiguration message or data 1130.

Responsive to receiving the domain name system reconfiguration data, the client device, or the virtual private network component of the client device, configures, or reconfigures, the domain name system server indicated in the domain name system reconfiguration data as the operative domain name system server for the virtual private network tunnel 1140. The domain name system server configured at the client device may be reconfigured for the current virtual private network tunnel, which may omit or exclude resetting or reestablishing the virtual private network tunnel with the current virtual private network entry server.

Subsequent to the client device reconfiguring the domain name system server 1140, the virtual private network entry server determines an optimal virtual private network exit server for obtaining the requested content from among one or more available and accessible virtual private network exit servers available and accessible using the operative domain name system server. For example, the request for content may indicate a domain name of the external system that hosts the requested content, and the virtual private network entry server may obtain an IP address of an external server, corresponding to the domain name, from the operative domain name system server.

The virtual private network entry server may send, transmit, or otherwise make available, the request for content to the identified virtual private network exit server. The virtual private network exit server may receive the request for content. The virtual private network exit server may sent, transmit, or otherwise make available the request for content to the external server. Responsive to the request for content, the virtual private network exit server may obtain the content from the external server. The virtual private network exit server may send, transmit, or otherwise make available the content to the virtual private network entry server. The virtual private network entry server may obtain the requested content from the virtual private network exit server. The virtual private network entry server may send, transmit, or otherwise make available, the requested content to the client device via the virtual private network tunnel.

The client device receives the requested content 1150 via the virtual private network tunnel from the virtual private network entry server.

As indicated by the broken directional line 1160 from receiving the requested content 1150 to requesting content 1120, requesting content 1120, receiving domain name system reconfiguration data 1130, reconfiguring domain name system configuration 1140, and receiving content 1150, may be repeated.

FIG. 12 is a flowchart of an example of domain name system configuration during virtual private network connection 1200 for a virtual private network service provider infrastructure system. Domain name system configuration during virtual private network connection 1200, or one or more portions thereof, may be implemented by one or more computing devices, such as one or more of the computing device 800 shown in FIG. 8, one or more of the computing and communications device 930, 941, 942, 951, 952, 953 shown in FIG. 9, the user device 102 shown in FIG. 1, the user device 102 shown in FIG. 2, the user device 102 shown in FIG. 3, or the device 700 shown in FIG. 7, or by a system, such as the network 950 shown in FIG. 9, including one or more computing devices.

Domain name system configuration during virtual private network connection 1200 includes establishing a virtual private network tunnel 1210, obtaining a content request 1220, generating domain name system reconfiguration data 1230, reconfiguring domain name system configuration 1240, obtaining the requested content 1250, and sending the requested content 1260.

A virtual private network service provider infrastructure device, such as a virtual private network entry server, such as one of the virtual private network servers 120 shown in FIGS. 1-3 or the virtual private network server 1020 shown in FIG. 10, may establish the virtual private network tunnel 1210 between the client device and a virtual private network service provide infrastructure device. For example, the virtual private network entry server may establish the virtual private network tunnel in response to receiving a request from the client device to establish the virtual private network tunnel.

Obtaining, initiating, or establishing, a virtual private network tunnel 1210 may include authentication (not shown), such as in response to receiving a request to authenticate with the virtual private network service provider infrastructure system from the client device. The authentication may be similar to the authentication described with respect to FIG. 2 or the authentication described with respect to FIG. 11, except as is described herein or as is otherwise clear from context.

Although not shown separately in FIG. 11, establishing the virtual private network tunnel 1210 may include the virtual private network service provide infrastructure system, or a component thereof, sending, transmitting, or otherwise making available, available virtual private network server data, such as data identifying, such as by domain name, URL, IP address, or a combination thereof, virtual private network servers available for establishing and operating a virtual private network tunnel between the client device and the virtual private network service provider infrastructure, or network. The virtual private network server availability data may include one or more IP addresses for one or more entry virtual private network servers available for establishing and operating a virtual private network tunnel between the client device and the virtual private network service provider infrastructure, or network. Establishing the virtual private network tunnel 1210 may include the user device identifying the virtual private network entry server for the virtual private network tunnel.

Although not shown separately in FIG. 11, establishing the virtual private network tunnel 1210 may include a component of the virtual private network service provider infrastructure system, such as from the application programming interface 106, 110 shown in FIG. 1, sending, transmitting, or otherwise making available, the virtual private network entry server data, or a portion thereof, to the client device. The virtual private network entry server may be an optimal available virtual private network entry server identified based on the location (geographic location) of the client device.

Establishing the virtual private network tunnel 1210 may include receiving, obtaining, or otherwise accessing, from the client device, data, such as one or more protocol data units, indicating a request to establish the virtual private network tunnel between the client device and the virtual private network entry server. In some implementations, the client device may include the attribute data, or a portion thereof, in the request to establish the virtual private network tunnel. In some implementations, the data received by the virtual private network entry server, from the client device, to establish the virtual private network tunnel, may include data identifying, such as by domain name or by IP address, one or more domain name system servers, such as a primary domain name system server, such as the primary domain name system server 1030 shown in FIG. 10, a secondary domain name system server, such as the secondary domain name system server 1040 shown in FIG. 10, or both, for the virtual private network tunnel. The virtual private network entry server may configure domain name system configuration data for the virtual private network tunnel 1212 by associating the domain name system server, or servers, obtained from the client device, with the virtual private network tunnel, the client device, or both.

The primary domain name system server may have, such as store, a defined list, or other data structure, of available virtual private network exit servers, such as the exchange points 1050, 1060 shown in FIG. 10, one or more respective defined lists, or other data structures, of external devices, systems, or domains accessible via the respective virtual private network exit servers available, or accessible, via the primary domain name system server. The secondary domain name system server may have, such as store, a defined list, or other data structure, of available virtual private network exit servers, one or more respective defined lists, or other data structures, of external devices, systems, or domains accessible via the respective virtual private network exit servers available, or accessible, via the secondary domain name system server.

The virtual private network exit servers available, or accessible, via the primary domain name system server may differ, or partially differ, from the virtual private network exit servers available, or accessible, via the secondary domain name system server. The external devices, systems, or domains available, or accessible, via the primary domain name system server may differ, or partially differ, from the external devices, systems, or domains available, or accessible, via the secondary domain name system server. For example, the primary domain name system server may be located (geographic location) relatively near the client device, which may be in a geofenced location such that devices, systems, or IP addresses located in some areas (geographic areas) may be unavailable or inaccessible to the primary domain name system server. In some implementations, one or more of the devices, systems, or IP addresses unavailable or inaccessible to the primary domain name system server may be available or accessible to the secondary domain name system server.

The virtual private network entry server receives, obtains, or otherwise accesses, a content request 1220, such as by receiving the request for content as one or more protocol data units, from the client device. The request for content identifies an external device, such as an external server, system, or domain, as a source for the content. For example, the client device may send a request for content hosted by an external device or system.

The virtual private network service provider control infrastructure, or one or more components thereof, determines whether the requested content is available, or accessible, from an external device, or server, accessible or available via the operative domain name system server for the virtual private network tunnel, such as the primary domain name system server.

In some implementations, the requested content, or feature, may be accessible or available from an external device that is accessible or available via the operative domain name system server for the virtual private network tunnel and reconfiguring the operative domain name system server 1240 may be omitted. For example, the virtual private network entry server may obtain an IP address for an external server hosting the requested content from the operative domain name system server configured for the virtual private network tunnel, may identify a virtual private network exit server for obtaining the content from the external server, and may determine that the requested content is available from the external server via the virtual private network exit server.

In some implementations, the requested content, or feature, may be inaccessible or unavailable from an external device that is accessible or available via the operative domain name system server for the virtual private network tunnel, indicating that a virtual private network system exit server for obtaining the content is unavailable using the operative domain name system server, and the virtual private network entry server may send, transmit, or otherwise make available, to the client device, one or more protocol data units, including a domain name system reconfiguration message, wherein the domain name system reconfiguration message indicates a another domain name system server, wherein a virtual private network system exit server for obtaining the content is available using the other domain name system server.

Responsive to determining that the requested content is unavailable from the external server accessible via the operative domain name system server, the virtual private network service provider control infrastructure, or one or more components thereof, identifies another domain name system server, wherein the requested content is available from an external server accessible using the other domain name system server. The virtual private network service provider control infrastructure, or one or more components thereof, generates the domain name system reconfiguration message 1230 indicating the other domain name system server to be configured at the client device for the virtual private network tunnel. The virtual private network service provider control infrastructure, or one or more components thereof, sends, via the virtual private network entry server, the domain name system reconfiguration message to the client device and configures, or associates, the client device, the virtual private network tunnel, or both, with the reconfigured domain name system server 1240.

Responsive to receiving the domain name system reconfiguration data, the client device, or the virtual private network component of the client device, configures, or reconfigures, the domain name system server indicated in the domain name system reconfiguration data as the operative domain name system server for the virtual private network tunnel. The domain name system server configured at the client device may be reconfigured for the current virtual private network tunnel, which may omit or exclude resetting or reestablishing the virtual private network tunnel with the current virtual private network entry server.

Subsequent to reconfiguring the domain name system server 1240, the virtual private network entry server obtains the requested content 1250. For example, the virtual private network entry server determines an optimal virtual private network exit server for obtaining the requested content from among one or more available and accessible virtual private network exit servers available and accessible using the operative domain name system server as reconfigured. For example, the request for content may indicate a domain name of the external system that hosts the requested content, and the virtual private network entry server may obtain an IP address of an external server, corresponding to the domain name, from the operative domain name system server.

The virtual private network entry server may send, transmit, or otherwise make available, the request for content to the identified virtual private network exit server. The virtual private network exit server may receive the request for content. The virtual private network exit server may send, transmit, or otherwise make available the request for content to the external server. Responsive to the request for content, the virtual private network exit server may obtain the content from the external server. The virtual private network exit server may send, transmit, or otherwise make available the content to the virtual private network entry server. The virtual private network entry server may obtain the requested content from the virtual private network exit server. The virtual private network entry server may send, transmit, or otherwise make available, the requested content to the client device via the virtual private network tunnel 1260.

As indicated by the broken directional line 1270 from sending the requested content 1260 to obtaining the request for content 1220, obtaining the request for content 1220, generating domain name system reconfiguration data 1230, reconfiguring domain name system configuration 1240, obtaining the requested content 1250, and sending the requested content 1260, may be repeated, such as to obtain other content.

Unless expressly stated, or otherwise clear from context, the terminology "computer," and variations or wordforms thereof, such as "computing device," "computing machine," "computing and communications device," and "computing unit," indicates a "computing device," such as the computing device 800 shown in FIG. 8, that implements, executes, or performs one or more aspects of the methods and techniques described herein, or is represented by data stored, processed, used, or communicated in accordance with the implementation, execution, or performance of one or more aspects of the methods and techniques described herein.

Unless expressly stated, or otherwise clear from context, the terminology "instructions," and variations or wordforms thereof, such as "code," "commands," or "directions," includes an expression, or expressions, of an aspect, or aspects, of the methods and techniques described herein, realized in hardware, software, or a combination thereof, executed, processed, or performed, by a processor, or processors, as described herein, to implement the respective aspect, or aspects, of the methods and techniques described herein. Unless expressly stated, or otherwise clear from context, the terminology "program," and variations or wordforms thereof, such as "algorithm," "function," "model," or "procedure," indicates a sequence or series of instructions, which may be iterative, recursive, or both.

Unless expressly stated, or otherwise clear from context, the terminology "communicate," and variations or wordforms thereof, such as "send," "receive," or "exchange," indicates sending, transmitting, or otherwise making available, receiving, obtaining, or otherwise accessing, or a combination thereof, data in a computer accessible form via an electronic data communications medium.

To the extent that the respective aspects, features, or elements of the devices, apparatus, methods, and techniques described or shown herein, are shown or described as a respective sequence, order, configuration, or orientation, thereof, such sequence, order, configuration, or orientation is explanatory and other sequences, orders, configurations, or orientations may be used, which may be include concurrent or parallel performance or execution of one or more aspects or elements thereof, and which may include devices, methods, and techniques, or aspects, elements, or components, thereof, that are not expressly described herein, except as is expressly described herein or as is otherwise clear from context. One or more of the devices, methods, and techniques, or aspects, elements, or components, thereof, described or shown herein may be omitted, or absent, from respective embodiments.

The figures, drawings, diagrams, illustrations, and charts, shown and described herein express or represent the devices, methods, and techniques, or aspects, elements, or components, thereof, as disclosed herein. The elements, such as blocks and connecting lines, of the figures, drawings, diagrams, illustrations, and charts, shown and described herein, or combinations thereof, may be implemented or realized as respective units, or combinations of units, of hardware, software, or both.

Unless expressly stated, or otherwise clear from context, the terminology "determine," "identify," and "obtain," and variations or wordforms thereof, indicates selecting, ascertaining, computing, looking up, receiving, determining, establishing, obtaining, or otherwise identifying or determining using one or more of the devices and methods shown and described herein. Unless expressly stated, or otherwise clear from context, the terminology "example," and variations or wordforms thereof, such as "embodiment" and "implementation," indicates a distinct, tangible, physical realization of one or more aspects, features, or elements of the devices, methods, and techniques described herein. Unless expressly stated, or otherwise clear from context, the examples described herein may be independent or may be combined.

Unless expressly stated, or otherwise clear from context, the terminology "or" is used herein inclusively (inclusive disjunction), rather than exclusively (exclusive disjunction). For example, unless expressly stated, or otherwise clear from context, the phrase "includes A or B" indicates the inclusion of "A," the inclusion of "B," or the inclusion of "A and B." Unless expressly stated, or otherwise clear from context, the terminology "a," or "an," is used herein to express singular or plural form. For example, the phrase "an apparatus" may indicate one apparatus or may indicate multiple apparatuses. Unless expressly stated, or otherwise clear from context, the terminology "including," "comprising," "containing," or "characterized by," is inclusive or open-ended such that some implementations or embodiments may be limited to the expressly recited or described aspects or elements, and some implementations or embodiments may include elements or aspects that are not expressly recited or described.

As used herein, numeric terminology that expresses quantity (or cardinality), magnitude, position, or order, such as numbers, such as 1 or 20.7, numerals, such as "one" or "one hundred," ordinals, such as "first" or "fourth," multiplicative numbers, such as "once" or "twice," multipliers, such as "double" or "triple," or distributive numbers, such as "singly," used descriptively herein are explanatory and non-limiting, except as is described herein or as is otherwise clear from context. For example, a "second" element may be performed prior to a "first" element, unless expressly stated, or otherwise clear from context.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for domain name system configuration during virtual private network connection, the method comprising:
receiving, by a virtual private network entry server, from a client device, via a virtual private network tunnel between the virtual private network entry server and the client device, a first request for first content, wherein the first request identifies a first external source for the first content;
receiving, by the virtual private network entry server, from an operative domain name system server configured for the virtual private network tunnel, an Internet Protocol (IP) address of a first virtual private network system exit server;
determining, by the virtual private network entry server, that the first content is unavailable via the first virtual private network system exit server;
in response to determining that the first content is unavailable via the first virtual private network system exit server, identifying, by the virtual private network entry server, a second domain name system server, such that a second virtual private network system exit server for obtaining the first content is available using the second domain name system server;
obtaining, by the virtual private network entry server, from the second virtual private network system exit server, the first content, wherein the second virtual private network system exit server obtained the first content from the first external source; and
transmitting, to the client device, via the virtual private network tunnel, the first content.

2. The method of claim 1, further comprising:
prior to receiving the first request, establishing the virtual private network tunnel, wherein establishing the virtual private network tunnel includes receiving, from the client device, virtual private network configuration data indicating a first domain name system server configured as the operative domain name system server for the virtual private network tunnel.

3. The method of claim 1, wherein receiving the first request includes:
receiving a request to establish the virtual private network tunnel; and
receiving virtual private network configuration data indicating a first domain name system server configured as the operative domain name system server for the virtual private network tunnel.

4. The method of claim 1, wherein:
to identify the first external source, the first request includes a universal resource locator (URL) value indicative of the first external source; and
prior to receiving the IP address, transmitting, to the operative domain name system server, the URL value.

5. The method of claim 1, wherein obtaining the first content includes:
transmitting, by the virtual private network entry server, to the client device, via the virtual private network tunnel, a domain name system configuration message, wherein the domain name system configuration message indicates the second domain name system server, such that the client device configures the second domain name system server as the operative domain name system server for the virtual private network tunnel.

6. The method of claim 1, further comprising:
receiving, by the virtual private network entry server, from the client device, via the virtual private network tunnel, a second request for second content that identifies a second external source for the second content;
determining, by the virtual private network entry server, that a third virtual private network system exit server for obtaining the second content from the second external source is available using the operative domain name system server; and
in response to determining that the third virtual private network system exit server for obtaining the second content from the second external source is available using the operative domain name system server:
obtaining, by the virtual private network entry server, from the third virtual private network system exit server, the second content, wherein the third virtual private network system exit server obtained the second content from the second external source; and
transmitting, to the client device, via the virtual private network tunnel, the second content, such that the client device omits reconfiguring the operative domain name system server to obtain the second content.

7. The method of claim 6, wherein:
the second request is received prior to receiving the first request, such that obtaining the second content is performed wherein the operative domain name system server is the first domain name system server.

8. The method of claim 6, wherein:
the first request is received prior to receiving the second request, such that obtaining the second content is performed wherein the operative domain name system server is the second domain name system server.

9. A virtual private network entry server apparatus comprising:
a non-transitory computer-readable storage medium; and
a processor configured to execute instructions stored in the non-transitory computer-readable storage medium to:
receive, from a client device, via a virtual private network tunnel between the virtual private network entry server and the client device, a first request for first content, wherein the first request identifies a first external source for the first content;
receive, from an operative domain name system server configured for the virtual private network tunnel, an Internet Protocol (IP) address of a first virtual private network system exit server;
determine that the first content is unavailable via the first virtual private network system exit server;
in response to determining that the first content is unavailable via the first virtual private network system exit server, identify a second domain name system server, such that a second virtual private network system exit server for obtaining the first content is available using the second domain name system server;
obtain, from the second virtual private network system exit server, the first content, wherein the second virtual private network system exit server obtained the first content from the first external source; and transmit, to the client device, via the virtual private network tunnel, the first content.

10. The virtual private network entry server apparatus of claim 9, wherein, prior to receiving the first request, the processor executes the instructions to establish the virtual private network tunnel, wherein to establish the virtual private network tunnel the processor executes the instructions to receive, from the client device, virtual private network configuration data indicating a first domain name system server configured as the operative domain name system server for the virtual private network tunnel.

11. The virtual private network entry server apparatus of claim 9, wherein, to receive the first request, the processor executes the instructions to:
   receive a request to establish the virtual private network tunnel; and
   receive virtual private network configuration data indicating a first domain name system server configured as the operative domain name system server for the virtual private network tunnel.

12. The virtual private network entry server apparatus of claim 9, wherein:
   to identify the first external source, the first request includes a universal resource locator (URL) value indicative of the first external source; and
   prior to receiving the IP address, the processor executes the instructions to transmit, to the operative domain name system server, the URL value.

13. The virtual private network entry server apparatus of claim 9, wherein to obtain the first content the processor executes the instructions to:
   transmit, to the client device, via the virtual private network tunnel, a domain name system configuration message, wherein the domain name system configuration message indicates the second domain name system server, such that the client device configures the second domain name system server as the operative domain name system server for the virtual private network tunnel.

14. The virtual private network entry server apparatus of claim 9, wherein the processor executes the instructions to:
   receive, from the client device, via the virtual private network tunnel, a second request for second content that identifies a second external source for the second content;
   determine that a third virtual private network system exit server for obtaining the second content from the second external source is available using the operative domain name system server; and
   in response to determining that the third virtual private network system exit server for obtaining the second content from the second external source is available using the operative domain name system server:
      obtain, from the third virtual private network system exit server, the second content, wherein the third virtual private network system exit server obtained the second content from the second external source; and
      transmit, to the client device, via the virtual private network tunnel, the second content, such that the client device omits reconfiguring the operative domain name system server to obtain the second content.

15. The virtual private network entry server apparatus of claim 14, wherein:
   the second request is received prior to receiving the first request, such that to obtain the second content the processor executes the instructions wherein the operative domain name system server is the first domain name system server.

16. The virtual private network entry server apparatus of claim 14, wherein:
   the first request is received prior to receiving the second request, such that to obtain the second content the processor executes the instructions wherein the operative domain name system server is the second domain name system server.

17. A non-transitory computer-readable storage medium, comprising executable instructions that, when executed by a processor, perform:
   receiving, by a virtual private network entry server, from a client device, via a virtual private network tunnel between the virtual private network entry server and the client device, a first request for first content, wherein the first request identifies a first external source for the first content;
   receiving, by the virtual private network entry server, from an operative domain name system server configured for the virtual private network tunnel, an Internet Protocol (IP) address of a first virtual private network system exit server;
   determining, by the virtual private network entry server, that the first content is unavailable via the first virtual private network system exit server;
   in response to determining that the first content is unavailable via the first virtual private network system exit server, identifying, by the virtual private network entry server, a second domain name system server, such that a second virtual private network system exit server for obtaining the first content is available using the second domain name system server;
   obtaining, by the virtual private network entry server, from the second virtual private network system exit server, the first content, wherein the second virtual private network system exit server obtained the first content from the first external source; and
   transmitting, to the client device, via the virtual private network tunnel, the first content.

18. The non-transitory computer-readable storage medium of claim 17, further comprising:
   receiving, by the virtual private network entry server, from the client device, via the virtual private network tunnel, a second request for second content that identifies a second external source for the second content;
   determining, by the virtual private network entry server, that a third virtual private network system exit server for obtaining the second content from the second external source is available using the operative domain name system server;
   in response to determining that the third virtual private network system exit server for obtaining the second content from the second external source is available using the operative domain name system server:
      obtaining, by the virtual private network entry server, from the third virtual private network system exit server, the second content, wherein the third virtual private network system exit server obtained the second content from the second external source; and
      transmitting, to the client device, via the virtual private network tunnel, the second content, such that the client device omits reconfiguring the operative domain name system server to obtain the second content.

19. The non-transitory computer-readable storage medium of claim 18, wherein:
   the second request is received prior to receiving the first request, such that obtaining the second content is performed wherein the operative domain name system server is the first domain name system server.

20. The non-transitory computer-readable storage medium of claim 18, wherein:
   the first request is received prior to receiving the second request, such that obtaining the second content is performed wherein the operative domain name system server is the second domain name system server.

* * * * *

UNITED STATES PATENT AND TRADEMARK OFFICE
CERTIFICATE OF CORRECTION

| | | |
|---|---|---|
| PATENT NO. | : 11,716,307 B1 | |
| APPLICATION NO. | : 17/724980 | |
| DATED | : August 1, 2023 | |
| INVENTOR(S) | : Lukas Baltrenas | |

It is certified that error appears in the above-identified patent and that said Letters Patent is hereby corrected as shown below:

On the Title Page

(71) Applicant:
Oversee, UAB, Vilnius (LT)
Should be:
Oversec, UAB, Vilnius (LT)

Signed and Sealed this
Fourth Day of June, 2024

Katherine Kelly Vidal
*Director of the United States Patent and Trademark Office*